(12) United States Patent
Chong et al.

(10) Patent No.: US 11,700,566 B2
(45) Date of Patent: Jul. 11, 2023

(54) NETWORK HANDOVER METHOD AND APPARATUS OF VOICE SERVICE

(71) Applicant: Huawei Technologies Co., Ltd., Shenzhen (CN)

(72) Inventors: Weiwei Chong, Shanghai (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 17/067,366

(22) Filed: Oct. 9, 2020

(65) Prior Publication Data

US 2021/0029611 A1    Jan. 28, 2021

Related U.S. Application Data

(63) Continuation of application No. PCT/CN2019/079778, filed on Mar. 27, 2019.

(30) Foreign Application Priority Data

Apr. 9, 2018    (CN) .......................... 201810312595.2

(51) Int. Cl.
| | |
|---|---|
| *H04W 76/30* | (2018.01) |
| *H04W 36/32* | (2009.01) |
| *H04W 36/00* | (2009.01) |
| *H04W 36/14* | (2009.01) |

(52) U.S. Cl.
CPC ....... *H04W 36/32* (2013.01); *H04W 36/0016* (2013.01); *H04W 36/14* (2013.01); *H04W 76/30* (2018.02)

(58) Field of Classification Search
CPC . H04W 36/32; H04W 36/0016; H04W 36/14; H04W 76/30; H04W 36/0022; H04W 36/0033

See application file for complete search history.

(56) References Cited

U.S. PATENT DOCUMENTS 8,027,314 B2    9/2011   Wu et al.
2005/0143053 A1  6/2005   Virtanen et al.
(Continued)

FOREIGN PATENT DOCUMENTS

CN    1682546 A    10/2005
CN   103561413 A    2/2014
(Continued)

OTHER PUBLICATIONS

Intel "Suspend existing POU Sessions in 5GS during SRVCC HO procedure," 3GPP DRAFT; S2-185173, May 28-Jun. 1, 2018, 4 pages.

(Continued)

*Primary Examiner* — Marcos L Torres
(74) *Attorney, Agent, or Firm* — Conley Rose, P.C.

(57) ABSTRACT

A method includes receiving, by a mobility management network element in a first network, first information from an access network device in the first network, where the first information indicates a handover of a terminal device from the first network to a second network, and sending, by the mobility management network element in the first network, second information to a mobility management network element in a third network based on the first information, where the second information instructs the mobility management network element in the third network to send a handover request to a mobile switching network element in the second network, and the handover request requests to hand over a voice service of the terminal device to the second network.

22 Claims, 10 Drawing Sheets

(56) References Cited

U.S. PATENT DOCUMENTS

| | | | |
|---|---|---|---|
| 2015/0146685 A1 | 5/2015 | Han et al. | |
| 2015/0163702 A1 | 6/2015 | Wu et al. | |
| 2021/0014754 A1 | 1/2021 | Ke | |
| 2021/0029594 A1* | 1/2021 | Kunz | H04W 36/14 |
| 2021/0195490 A1* | 6/2021 | Rommer | H04W 36/0022 |

FOREIGN PATENT DOCUMENTS

| | | | |
|---|---|---|---|
| CN | 103906158 A | 7/2014 | |
| CN | 103987092 A | 8/2014 | |
| CN | 104918292 A | 9/2015 | |
| CN | 107172067 A | 9/2017 | |
| JP | 2021520138 A | 8/2021 | |
| KR | 20180032461 A | 3/2018 | |
| WO | 2014029060 A1 | 2/2014 | |
| WO | WO-2019117768 A1 * | 6/2019 | H04L 65/1016 |
| WO | 2019196799 A1 | 10/2019 | |

OTHER PUBLICATIONS

China Unicom et al, "Potential implementations of voice service continuity from 5G to 2/3G," 3GPP TSG-SA WG1 Meeting #80,S1-174157, Reno, USA, Nov. 25-Dec. 1, 2017, 6 pages.

China Unicom, et al., "New WID on 5G Voice Service Continuity," 3GPP TSG SA Meeting #78, Lisbon, PT, Dec. 20-22, 2017, SP-171075, 3 pages.

3GPP TS 23.502 V15.1.0, "3rd Generation Partnership Project; Technical Specification Group Services and System Aspects; Procedures for the 5G System; Stage 2, (Release 15)," Mar. 2018, 285 pages.

3GPP TS 23.216 V15.1.0, "3rd Generation Partnership Project; Technical Specification Group Services and System Aspects; Single Radio Voice Call Continuity (SRVCC); Stage 2 (Release 15)," Dec. 2017, 69 pages.

SA WG2, "New SID: Study on single radio voice continuity from 5GS to 3G," 3GPP TSG SA Meeting #79, Mar. 21-23, 2018, Chennai, India, SP-180239, 4 pages.

\* cited by examiner

NETWORK HANDOVER METHOD AND APPARATUS OF VOICE SERVICE

CROSS-REFERENCE TO RELATED APPLICATIONS

This application is a continuation of International Patent Application No. PCT/CN2019/079778 filed on Mar. 27, 2019, which claims priority to Chinese Patent Application No. 201810312595.2 filed on Apr. 9, 2018. The disclosures of the aforementioned applications are hereby incorporated by reference in their entireties.

TECHNICAL FIELD

Embodiments of this application relate to the field of communications technologies, and in particular, to a network handover method and apparatus of a voice service.

BACKGROUND

Currently, in a fifth-generation (5G) network, there is a problem such as relatively small coverage due to use of a high frequency signal. Consequently, a terminal device cannot implement a continuous voice service in the 5G network. For example, after a terminal device that uses a voice service leaves coverage of a voice service of a 5G network, the voice service is interrupted.

In other approaches, after a terminal device leaves coverage of a voice service of a 5G network, a voice service of the terminal device may be handed over from the 5G network to an Evolved Packet System (EPS) network, that is, a commonly known 4th-generation (4G) network such that the voice service of the terminal device is kept continuous. However, when there is no signal of the EPS network, the EPS network has a relatively weak signal, or the EPS network does not support the voice service, the terminal device still cannot implement the voice service.

SUMMARY

A technical problem to be resolved in the embodiments of this application is to provide a network handover method of a voice service, to resolve a problem that a terminal device cannot implement a voice service.

Therefore, technical solutions used in the embodiments of the present disclosure to resolve the technical problem are as follows.

According to a first aspect, a network handover method of a voice service is provided. The method includes receiving, by a mobility management network element (for example, an access and mobility management function (AMF) network element) in a first network, first information from an access network device (for example, a next-generation radio access network (NG-RAN) device) in the first network, where the first information is used to indicate a handover of a terminal device from the first network to a second network, and sending, by the mobility management network element in the first network, second information to a mobility management network element (for example, a mobility management entity (MME) network element) in a third network based on the first information, where the second information is used to instruct the mobility management network element in the third network to send a handover request to a mobile switching network element (for example, a mobile switching center (MSC) network element) in the second network, and the handover request is used to hand over a voice service of the terminal device to the second network.

In the method provided in the first aspect, communication between the first network and the third network and communication between the third network and the second network enable the voice service of the terminal device to be handed over to the second network, implementing continuity of the voice service and resolving a problem that the terminal device cannot implement the voice service in the first network.

In a possible design, the first information is used to indicate a handover of the voice service of the terminal device from the first network to the second network. In the design, the handover of the voice service of the terminal device from the first network to the second network is to maintain continuity of the voice service.

In a possible design, the second network supports a circuit-switched voice service.

In a possible design, the method further includes sending, by the mobility management network element in the first network, information about the terminal device to the mobility management network element in the third network, where the information about the terminal device includes one or more of the following information: a classmark of the terminal device, information about a codec supported by the terminal device, and subscription information used to hand over the voice service of the terminal device to the second network.

In a possible design, the first information includes a first identifier of a voice handover from the first network to the second network and/or a target identifier of the second network, and the second information includes a second identifier of a voice handover from the first network to the second network and/or the target identifier of the second network.

In a possible design, the method further includes receiving, by the mobility management network element in the first network, session information of the third network of the terminal device from a session management network element in the first network, where the session information of the third network includes session management context information of a voice service of the third network and/or session management context information of a non-voice service of the third network, and sending, by the mobility management network element in the first network, the session information of the third network to the mobility management network element in the third network.

In the design, the mobility management network element in the first network sends the session management context information of the voice service of the third network of the terminal device and/or the session management context information of the non-voice service of the third network of the terminal device to the mobility management network element in the third network, the session management context information of the voice service of the third network is used to indicate the handover of the voice service of the terminal device such that the mobility management network element in the third network determines the handover of the voice service of the terminal device based on the second information and the session management context information of the voice service of the third network, and the session management context information of the non-voice service of the third network is used to indicate a handover of a non-voice service of the terminal device.

In a possible design, the method further includes sending, by the mobility management network element in the first network, third information to the session management network element in the first network, where the third information is used to indicate a handover of the terminal device from the first network to the second network, and the third information includes a third identifier of a voice handover from the first network to the second network and/or the target identifier of the second network.

In a possible design, the method further includes determining, by the mobility management network element in the first network, that a handover of a non-voice service of the terminal device from the first network to the second network is supported.

In a possible design, that the handover of a non-voice service of the terminal device from the first network to the second network is supported includes at least one or more of the terminal device, a device in the first network, a device in the second network, and a device in the third network support the handover of the non-voice service of the terminal device from the first network to the second network.

In a possible design, that the handover of a non-voice service of the terminal device from the first network to the second network is supported includes the handover of the non-voice service from the first network to the second network in a process of handing over the voice service of the terminal device from the first network to the second network is supported.

In a possible design, the method further includes sending, by the mobility management network element in the first network, a session deletion request to the session management network element in the first network after determining that the handover of the terminal device from the first network to the second network is completed, where the session deletion request is used to request the session management network element in the first network to delete session management context information of the first network of the terminal device and/or session management context information of the third network of the terminal device, and the session management context information of the third network is generated based on the session management context information of the first network.

In the design, the session management network element in the first network is requested to delete the session management context information of the first network of the terminal device and/or the session management context information of the third network of the terminal device, to release occupation of a network resource of the first network.

In a possible design, the method further includes sending, by the mobility management network element in the first network, cause information to the session management network element in the first network, where the cause information is used to indicate a reason why the session management context information of the first network of the terminal device and/or the session management context information of the third network of the terminal device are/is deleted.

In a possible design, the cause information includes information indicating that the handover of the voice service of the terminal device from the first network to the second network is completed.

In a possible design, the method further includes sending, by the mobility management network element in the first network, fourth information to the session management network element in the first network, where the fourth information is used to indicate that the handover of the terminal device from the first network to the second network is completed.

In the design, the fourth information is sent to the session management network element in the first network such that the session management network element in the first network may be triggered to delete the session management context information of the first network of the terminal device and/or the session management context information of the third network of the terminal device, to release occupation of a network resource of the first network.

In the design, the fourth information is sent to the session management network element in the first network such that the session management network element in the first network may be triggered to suspend the session management context information of the non-voice service, to ensure that a suspended non-voice service can be resumed as the terminal device requires and avoid that the terminal device and a network side re-establish session management context information for the non-voice service, shortening a delay and reducing overheads.

In a possible design, the method further includes determining, by the mobility management network element in the first network, that an interoperation interface exists between the mobility management network element in the first network and the mobility management network element in the third network.

In a possible design, the mobility management network element in the first network skips, based on the first information, an operation of obtaining the session management context information of the third network of the terminal device from the session management network element in the first network.

In the design, the mobility management network element in the first network skips the operation of obtaining the session management context information of the third network of the terminal device, reducing signaling overheads.

In a possible design, before skipping, by the mobility management network element in the first network based on the first information, an operation of obtaining the session management context information of the third network of the terminal device from the session management network element in the first network, the method further includes determining, by the mobility management network element in the first network, that a handover of a non-voice service of the terminal device from the first network to the second network is not supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the handover of the non-voice service from the first network to the second network in a process of handing over the voice service of the terminal device from the first network to the second network is not supported.

According to a second aspect, a network handover method of a voice service is provided. The method includes receiving, by a mobility management network element in a third network, second information from a mobility management network element in a first network, where the second information is used to indicate a handover of a terminal device from the first network to a second network, and sending, by the mobility management network element in the third network, a handover request to a mobile switching network element in the second network based on the second information, where the handover request is used to hand over a voice service of the terminal device to the second network.

In the method provided in the second aspect, communication between the first network and the third network and communication between the third network and the second network enable the voice service of the terminal device to be handed over to the second network, implementing continuity of the voice service and resolving a problem that the terminal device cannot implement the voice service in the first network.

In a possible design, the method further includes receiving, by the mobility management network element in the third network, information about the terminal device from the mobility management network element in the first network, where the information about the terminal device includes one or more of the following information: a classmark of the terminal device, information about a codec supported by the terminal device, and subscription information used to hand over the voice service of the terminal device to the second network, and sending, by the mobility management network element in the third network, the information about the terminal device to the mobile switching network element in the second network.

In a possible design, the method further includes sending, by the mobility management network element in the third network, network identifier information to the mobile switching network element in the second network, where the network identifier information is used to indicate that the terminal device is from the first network.

In the design, the mobility management network element in the third network can trigger the mobile switching network element in the second network to return the terminal device from the second network to the first network such that the first network provides a service for the terminal device, enhancing user experience.

In a possible design, the method further includes determining, by the mobility management network element in the third network, that returning of the terminal device from the second network to the first network is supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported is supported.

In a possible design, the second information includes an identifier of a voice handover from the first network to the second network and/or a target identifier of the second network. In the design, the handover of the voice service of the terminal device from the first network to the second network is to maintain continuity of the voice service.

In a possible design, the method further includes receiving, by the mobility management network element in the third network, session management context information of a non-voice service of the third network of the terminal device from the mobility management network element in the first network, and triggering, by the mobility management network element in the third network, a handover of a non-voice service of the terminal device to the second network based on the session management context information of the non-voice service of the third network of the terminal device.

In the design, when the voice service of the terminal device is handed over to the second network, the non-voice service of the terminal device can also be handed over to the second network. Therefore, when the first network cannot provide a service for the terminal device, the second network continues to serve the terminal device, improving user experience.

According to a third aspect, an information obtaining method is provided. The method includes receiving, by a session management network element in a first network, third information from a mobility management network element in the first network, where the third information is used to indicate a handover of a terminal device from the first network to a second network, performing, by the session management network element in the first network, a separation operation on session management context information of a third network of the terminal device based on the third information, to obtain separated session management context information, where the separated session management context information includes session management context information of a non-voice service of the third network of the terminal device that is obtained after separation and/or session management context information of a voice service of the third network of the terminal device that is obtained after separation, and sending, by the session management network element in the first network, the separated session management context information to the mobility management network element in the first network.

In the method according to the third aspect, the session management network element in the first network provides the mobility management network element in the first network with the session management context information of the non-voice service of the third network of the terminal device that is obtained after separation and/or the session management context information of the voice service of the third network of the terminal device that is obtained after separation, where the session management context information of the voice service of the third network indicates a handover of a voice service of the terminal device such that the mobility management network element in the third network determines the handover of the voice service of the terminal device based on the second information and the session management context information of the voice service of the third network, and the session management context information of the non-voice service of the third network is used to indicate a handover of a non-voice service of the terminal device.

In a possible design, the third information is used to indicate a handover of the voice service of the terminal device from the first network to the second network. In the design, the handover of the voice service of the terminal device from the first network to the second network is to maintain continuity of the voice service.

In a possible design, before the session management network element in the first network sends the session management context information of the non-voice service of the third network of the terminal device to the mobility management network element in the first network, the method further includes determining, by the session management network element in the first network, that a handover of a non-voice service of the terminal device from the first network to the second network is supported.

In a possible design, that the handover of a non-voice service of the terminal device from the first network to the second network is supported includes at least one or more of the terminal device, a device in the first network, a device in the second network, and a device in the third network support the handover of the non-voice service of the terminal device from the first network to the second network.

In a possible design, that the handover of a non-voice service of the terminal device from the first network to the second network is supported includes the handover of the non-voice service from the first network to the second network in a process of handing over the voice service of the terminal device from the first network to the second network is supported.

In a possible design, the session management network element in the first network suspends the session management context information of the non-voice service of the third network of the terminal device based on the third information.

In the design, the session management network element in the first network suspends the session management context information of the non-voice service, to ensure that a suspended non-voice service can be resumed as the terminal device requires and avoid that the terminal device and a network side re-establish session management context information for the non-voice service, shortening a delay and reducing overheads.

In a possible design, before suspending, by the session management network element in the first network, the session management context information of the non-voice service of the third network of the terminal device, the method further includes determining, by the session management network element in the first network, that a handover of a non-voice service of the terminal device from the first network to the second network is not supported or determining that returning of the terminal device from the second network to the first network is supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported.

According to a fourth aspect, an information obtaining method is provided. The method includes receiving, by a session management network element in a first network, third information from a mobility management network element in the first network, where the third information is used to indicate a handover of a terminal device from the first network to a second network, and skipping, by the session management network element in the first network based on the third information, an operation of sending session management context information of a third network of the terminal device to the mobility management network element in the first network.

In the method according to the fourth aspect, the session management network element in the first network skips the operation of sending the session management context information of the third network of the terminal device to the mobility management network element in the first network, reducing signal overheads.

In a possible design, the third information is used to indicate a handover of a voice service of the terminal device from the first network to the second network. In the design, the handover of the voice service of the terminal device from the first network to the second network is to maintain continuity of the voice service.

In a possible design, before skipping, by the session management network element in the first network based on the third information, an operation of sending session management context information of a third network of the terminal device to the mobility management network element in the first network, the method further includes determining, by the session management network element in the first network, that a handover of a non-voice service of the terminal device from the first network to the second network is not supported.

In a possible design, that the handover of a non-voice service of the terminal device from the first network to the second network is not supported includes At least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

According to a fifth aspect, an information suspension method is provided. The method includes receiving, by a session management network element in a first network, third information from a mobility management network element in the first network, where the third information is used to indicate a handover of a terminal device from the first network to a second network, and suspending, by the session management network element in the first network, session management context information of a non-voice service of the first network of the terminal device and/or session management context information of a non-voice service of a third network of the terminal device based on the third information.

In the method according to the fifth aspect, the session management network element in the first network suspends the session management context information of the non-voice service, to ensure that a suspended non-voice service can be resumed as the terminal device requires and avoid that the terminal device and a network side re-establish session management context information for the non-voice service, shortening a delay and reducing overheads.

In a possible design, the third information is used to indicate a handover of a voice service of the terminal device from the first network to the second network. In the design, the handover of the voice service of the terminal device from the first network to the second network is to maintain continuity of the voice service.

In a possible design, before suspending, by the session management network element in the first network, session management context information of a non-voice service of the first network of the terminal device and/or session management context information of a non-voice service of a third network of the terminal device, the method further includes determining, by the session management network element in the first network, that a handover of a non-voice service of the terminal device from the first network to the second network is not supported or determining that returning of the terminal device from the second network to the first network is supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

In a possible design, that returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported is supported.

According to a sixth aspect, an information suspension method is provided. The method includes receiving, by a session management network element in a first network, fourth information from a mobility management network element in the first network, where the fourth information is used to indicate that a handover of a terminal device from the first network to a second network is completed, and suspending, by the session management network element in the first network, session management context information of a non-voice service of the first network of the terminal device and/or session management context information of a non-voice service of a third network of the terminal device based on the fourth information.

In the method according to the sixth aspect, the session management network element in the first network suspends the session management context information of the non-voice service, to ensure that a suspended non-voice service can be resumed as the terminal device requires and avoid that the terminal device and a network side re-establish session management context information for the non-voice service, shortening a delay and reducing overheads.

In a possible design, the fourth information is used to indicate that a handover of a voice service of the terminal device from the first network to the second network is completed. In the design, the handover of the voice service of the terminal device from the first network to the second network is to maintain continuity of the voice service.

In a possible design, before suspending, by the session management network element in the first network, session management context information of a non-voice service of the first network of the terminal device and/or session management context information of a non-voice service of a third network of the terminal device, the method further includes determining, by the session management network element in the first network, that a handover of a non-voice service of the terminal device from the first network to the second network is not supported or determining that returning of the terminal device from the second network to the first network is supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported is supported.

According to a seventh aspect, an information deletion method is provided. The method includes receiving, by a session management network element in a first network, fourth information from a mobility management network element in the first network, where the fourth information is used to indicate that a handover of a terminal device from the first network to a second network is completed, and deleting, by the session management network element in the first network, session management context information of the first network of the terminal device and/or session management context information of a third network of the terminal device based on the fourth information.

In the method according to the seventh aspect, the session management network element in the first network deletes the session management context information of the first network of the terminal device and/or the session management context information of the third network of the terminal device after the handover is completed, to release occupation of a network resource of the first network.

In a possible design, the fourth information is used to indicate that a handover of a voice service of the terminal device from the first network to the second network is completed. In the design, the handover of the voice service of the terminal device from the first network to the second network is to maintain continuity of the voice service.

In a possible design, deleting, by the session management network element in the first network, session management context information of the first network of the terminal device includes deleting, by the session management network element in the first network, session management context information of a voice service of the first network of the terminal device and/or session management context information of a non-voice service of the first network of the terminal device, and deleting, by the session management network element in the first network, session management context information of a third network of the terminal device includes deleting, by the session management network element in the first network, session management context information of a voice service of the third network of the terminal device and/or session management context information of a non-voice service of the third network of the terminal device.

In a possible design, before deleting, by the session management network element in the first network, session management context information of a non-voice service of the first network of the terminal device, the method further includes determining, by the session management network element in the first network, that a handover of a non-voice service of the terminal device from the first network to the second network is not supported or determining that returning of the terminal device from the second network to the first network is not supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

In a possible design, returning of the terminal device from the second network to the first network is not supported is not supported includes at least one or more of the terminal device, a device in the first network, a device in the second network, and a device in the third network do not support returning of the terminal device from the second network to the first network.

In a possible design, returning of the terminal device from the second network to the first network is not supported is not supported includes returning of the terminal device from the second network to the first network after the voice service of the second network ends is supported is not supported.

According to an eighth aspect, a network returning method is provided. The method includes receiving, by a mobile switching network element in a second network, network identifier information from a mobility management network element in a third network, where the network identifier information is used to indicate that a terminal device is from a first network, and triggering, by the mobile switching network element in the second network based on the network identifier information, a base station controller in the second network to return the terminal device from the second network to the first network.

In the method according to the eighth aspect, the mobile switching network element in the second network returns the terminal device from the second network to the first network such that the first network provides a service for the terminal device, enhancing user experience.

In a possible design, the mobile switching network element in the second network triggers, based on the network identifier information, the base station controller in the second network to return the terminal device from the second network to the first network when releasing a radio resource of the terminal device.

In a possible design, triggering, by the mobile switching network element in the second network based on the network identifier information, a base station controller in the second network to return the terminal device from the second network to the first network includes sending, by the mobile switching network element in the second network, the network identifier information to the base station controller in the second network.

In a possible design, sending, by the mobile switching network element in the second network, the network identifier information to the base station controller in the second network includes sending, by the mobile switching network element in the second network, the network identifier information to the base station controller in the second network when sending a handover request message, a signaling connection establishment response, or a radio resource release request to the base station controller in the second network.

In a possible design, the mobile switching network element in the second network determines that returning of the terminal device from the second network to the first network is supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported.

According to a ninth aspect, a network handover apparatus of a voice service is provided. The apparatus includes a receiving unit configured to receive first information from an access network device in a first network, where the first information is used to indicate a handover of a terminal device from the first network to a second network, and a sending unit configured to send second information to a mobility management network element in a third network based on the first information, where the second information is used to instruct the mobility management network element in the third network to send a handover request to a mobile switching network element in the second network, and the handover request is used to hand over a voice service of the terminal device to the second network.

In the apparatus provided in the ninth aspect, communication between the first network and the third network and communication between the third network and the second network enable the voice service of the terminal device to be handed over to the second network, implementing continuity of the voice service and resolving a problem that the terminal device cannot implement the voice service in the first network.

In a possible design, the first information is used to indicate a handover of the voice service of the terminal device from the first network to the second network. In the design, the handover of the voice service of the terminal device from the first network to the second network is to maintain continuity of the voice service.

In a possible design, the second network supports a circuit-switched voice service.

In a possible design, the sending unit is further configured to send information about the terminal device to the mobility management network element in the third network, where the information about the terminal device includes one or more of the following information: a classmark of the terminal device, information about a codec supported by the terminal device, and subscription information used to hand over the voice service of the terminal device to the second network.

In a possible design, the first information includes a first identifier of a voice handover from the first network to the second network and/or a target identifier of the second network, and the second information includes a second identifier of a voice handover from the first network to the second network and/or the target identifier of the second network.

In a possible design, the receiving unit is further configured to receive session management context information of the third network of the terminal device from a session management network element in the first network, where the session management context information of the third network includes session management context information of a voice service of the third network or session management context information of a non-voice service of the third network of the terminal device, and the sending unit is further configured to send the session management context information of the third network of the terminal device to the mobility management network element in the third network.

In the design, the session management context information of the voice service of the third network of the terminal device and/or the session management context information of the non-voice service of the third network of the terminal device are/is sent to the mobility management network element in the third network, the session management context information of the voice service of the third network is used to indicate the handover of the voice service of the terminal device such that the mobility management network element in the third network determines the handover of the voice service of the terminal device based on the second information and the session management context information of the voice service of the third network, and the session management context information of the non-voice service of the third network is used to indicate a handover of a non-voice service of the terminal device.

In a possible design, the sending unit is further configured to send third information to the session management network element in the first network, where the third information is used to indicate a handover of the terminal device from the first network to the second network, and the third information includes a third identifier of a voice handover from the first network to the second network and/or the target identifier of the second network.

In a possible design, the apparatus further includes a first determining unit configured to determine that a handover of a non-voice service of the terminal device from the first network to the second network is supported.

In a possible design, that the handover of a non-voice service of the terminal device from the first network to the second network is supported includes at least one or more of the terminal device, a device in the first network, a device in the second network, and a device in the third network support the handover of the non-voice service of the terminal device from the first network to the second network.

In a possible design, that the handover of a non-voice service of the terminal device from the first network to the second network is supported includes the handover of the non-voice service from the first network to the second network in a process of handing over the voice service of the terminal device from the first network to the second network is supported.

In a possible design, the apparatus further includes a second determining unit configured to send, using the sending unit, a session deletion request to the session management network element in the first network after determining that the handover of the terminal device from the first network to the second network is completed, where the session deletion request is used to request the session management network element in the first network to delete session management context information of the first network of the terminal device and/or session management context information of the third network of the terminal device, and the session management context information of the third network is generated based on the session management context information of the first network.

In the design, the session management network element in the first network is requested to delete the session management context information of the first network of the terminal device and/or the session management context information of the third network of the terminal device, to release occupation of a network resource of the first network.

In a possible design, the sending unit is further configured to send cause information to the session management network element in the first network, where the cause information is used to indicate a reason why the session management context information of the first network of the terminal device and/or the session management context information of the third network of the terminal device are/is deleted.

In a possible design, the cause information includes information indicating that the handover of the voice service of the terminal device from the first network to the second network is completed.

In a possible design, the sending unit is further configured to send fourth information to the session management network element in the first network, where the fourth information is used to indicate that the handover of the terminal device from the first network to the second network is completed.

In the design, the fourth information is sent to the session management network element in the first network such that the session management network element in the first network may be triggered to delete the session management context information of the first network of the terminal device and/or the session management context information of the third network of the terminal device, to release occupation of a network resource of the first network.

In the design, the fourth information is sent to the session management network element in the first network such that the session management network element in the first network may be triggered to suspend the session management context information of the non-voice service, to ensure that a suspended non-voice service can be resumed as the terminal device requires and avoid that the terminal device and a network side re-establish session management context information for the non-voice service, shortening a delay and reducing overheads.

In a possible design, the apparatus further includes a third determining unit configured to determine that an interoperation interface exists between the mobility management network element in the first network and the mobility management network element in the third network.

In a possible design, the apparatus further includes a skipping unit configured to skip, based on the first information, an operation of obtaining the session management context information of the third network of the terminal device from the session management network element in the first network.

In the design, the operation of obtaining the session management context information of the third network of the terminal device is skipped, reducing signaling overheads.

In a possible design, the apparatus further includes a fourth determining unit configured to determine that a handover of a non-voice service of the terminal device from the first network to the second network is not supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the handover of the non-voice service from the first network to the second network in a process of handing over the voice service of the terminal device from the first network to the second network is not supported.

According to a tenth aspect, a network handover apparatus of a voice service is provided. The apparatus includes a receiving unit configured to receive second information from a mobility management network element in a first network, where the second information is used to indicate a handover of a terminal device from the first network to a second network, and a sending unit configured to send a handover request to a mobile switching network element in the second network based on the second information, where the handover request is used to hand over a voice service of the terminal device to the second network.

In the apparatus provided in the tenth aspect, communication between the first network and a third network and communication between the third network and the second network enable the voice service of the terminal device to be handed over to the second network, implementing continuity of the voice service and resolving a problem that the terminal device cannot implement the voice service in the first network.

In a possible design, the receiving unit is further configured to receive information about the terminal device from the mobility management network element in the first network, where the information about the terminal device includes one or more of the following information: a classmark of the terminal device, information about a codec supported by the terminal device, and subscription information used to hand over the voice service of the terminal device to the second network, and the sending unit is further configured to send the information about the terminal device.

In a possible design, the sending unit is further configured to send network identifier information to the mobile switching network element in the second network, where the network identifier information is used to indicate that the terminal device is from the first network.

In the design, the mobile switching network element in the second network can be triggered to return the terminal device from the second network to the first network such that the first network provides a service for the terminal device, enhancing user experience.

In a possible design, the apparatus further includes a determining unit configured to determine that returning of the terminal device from the second network to the first network is supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported.

In a possible design, the second information includes an identifier of a voice handover from the first network to the second network and/or a target identifier of the second network. In the design, the handover of the voice service of the terminal device from the first network to the second network is to maintain continuity of the voice service.

In a possible design, the apparatus further includes a triggering unit, and the receiving unit is further configured to receive session management context information of a non-voice service of the third network of the terminal device from the mobility management network element in the first network, and the triggering unit is configured to trigger a handover of a non-voice service of the terminal device to the second network based on the session management context information of the non-voice service of the third network of the terminal device.

In the design, when the voice service of the terminal device is handed over to the second network, the non-voice service of the terminal device can also be handed over to the second network. Therefore, when the first network cannot provide a service for the terminal device, the second network continues to serve the terminal device, improving user experience.

According to an eleventh aspect, an information obtaining apparatus is provided. The apparatus includes a receiving unit configured to receive third information from a mobility management network element in a first network, where the third information is used to indicate a handover of a terminal device from the first network to a second network, a separation unit configured to perform a separation operation on session management context information of a third network of the terminal device based on the third information, to obtain separated session management context information, where the separated session management context information includes session management context information of a non-voice service of the third network of the terminal device and/or session management context information of a voice service of the third network of the terminal device that is obtained after separation, and a sending unit configured to send the separated session management context information to the mobility management network element in the first network.

In the apparatus according to the eleventh aspect, the session management context information of the non-voice service of the third network of the terminal device that is obtained after separation and/or the session management context information of the voice service of the third network of the terminal device that is obtained after separation are/is provided for the mobility management network element in the first network, the session management context information of the voice service of the third network indicates a handover of a voice service of the terminal device such that the mobility management network element in the third network determines the handover of the voice service of the terminal device based on the second information and the session management context information of the voice service of the third network, and the session management context information of the non-voice service of the third network is used to indicate a handover of a non-voice service of the terminal device.

In a possible design, the third information is used to indicate a handover of the voice service of the terminal device from the first network to the second network. In the design, the handover of the voice service of the terminal device from the first network to the second network is to maintain continuity of the voice service.

In a possible design, the apparatus further includes a first determining unit configured to determine that a handover of a non-voice service of the terminal device from the first network to the second network is supported.

In a possible design, the handover of a non-voice service of the terminal device from the first network to the second network is supported includes at least one or more of the terminal device, a device in the first network, a device in the second network, and a device in the third network support the handover of the non-voice service of the terminal device from the first network to the second network.

In a possible design, that the handover of a non-voice service of the terminal device from the first network to the second network is supported includes the handover of the non-voice service from the first network to the second network in a process of handing over the voice service of the terminal device from the first network to the second network is supported.

In a possible design, the apparatus further includes a suspension unit configured to suspend the session management context information of the non-voice service of the third network of the terminal device based on the third information.

In the design, the session management context information of the non-voice service is suspended, to ensure that a suspended non-voice service can be resumed as the terminal device requires and avoid that the terminal device and a network side re-establish session management context information for the non-voice service, shortening a delay and reducing overheads.

In a possible design, the apparatus further includes a second determining unit configured to determine that a handover of a non-voice service of the terminal device from the first network to the second network is not supported, or determine that returning of the terminal device from the second network to the first network is supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported.

According to a twelfth aspect, an information processing apparatus is provided. The apparatus includes a receiving unit configured to receive third information from a mobility management network element in a first network, where the third information is used to indicate a handover of a terminal device from the first network to a second network, and a skipping unit configured to skip, based on the third information, an operation of sending session management context information of a third network of the terminal device to the mobility management network element in the first network.

In the apparatus according to the twelfth aspect, the operation of sending the session management context information of the third network of the terminal device to the mobility management network element in the first network is skipped, reducing signal overheads.

In a possible design, the third information is used to indicate a handover of a voice service of the terminal device from the first network to the second network. In the design, the handover of the voice service of the terminal device from the first network to the second network is to maintain continuity of the voice service.

In a possible design, the apparatus further includes a determining unit configured to determine that a handover of a non-voice service of the terminal device from the first network to the second network is not supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

According to a thirteenth aspect, an information suspension apparatus is provided. The apparatus includes a receiving unit configured to receive third information from a mobility management network element in a first network, where the third information is used to indicate a handover of a terminal device from the first network to a second network, and a suspension unit configured to suspend session management context information of a non-voice service of the first network of the terminal device and/or session management context information of a non-voice service of a third network of the terminal device based on the third information.

In the apparatus according to the thirteenth aspect, the session management context information of the non-voice service is suspended, to ensure that a suspended non-voice service can be resumed as the terminal device requires and avoid that the terminal device and a network side re-establish session management context information for the non-voice service, shortening a delay and reducing overheads.

In a possible design, the third information is used to indicate a handover of a voice service of the terminal device from the first network to the second network. In the design, the handover of the voice service of the terminal device from the first network to the second network is to maintain continuity of the voice service.

In a possible design, the apparatus further includes a determining unit configured to determine that a handover of a non-voice service of the terminal device from the first network to the second network is not supported, or determine that returning of the terminal device from the second network to the first network is supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported.

According to a fourteenth aspect, an information suspension apparatus is provided. The apparatus includes a receiving unit configured to receive fourth information from a mobility management network element in a first network, where the fourth information is used to indicate that a handover of a terminal device from the first network to a second network is completed, and a suspension unit configured to suspend session management context information of a non-voice service of the first network of the terminal device and/or session management context information of a non-voice service of a third network of the terminal device based on the fourth information.

In the apparatus according to the fourteenth aspect, the session management context information of the non-voice service is suspended, to ensure that a suspended non-voice service can be resumed as the terminal device requires and avoid that the terminal device and a network side re-establish session management context information for the non-voice service, shortening a delay and reducing overheads.

In a possible design, the fourth information is used to indicate that a handover of a voice service of the terminal device from the first network to the second network is completed. In the design, the handover of the voice service of the terminal device from the first network to the second network is to maintain continuity of the voice service.

In a possible design, the apparatus further includes a determining unit configured to determine that a handover of a non-voice service of the terminal device from the first network to the second network is not supported, or determine that returning of the terminal device from the second network to the first network is supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported.

According to a fifteenth aspect, an information deletion apparatus is provided. The apparatus includes a receiving unit configured to receive fourth information from a mobility management network element in a first network, where the fourth information is used to indicate that a handover of a terminal device from the first network to a second network is completed, and a deletion unit configured to delete session management context information of the first network of the terminal device and/or session management context information of a third network of the terminal device based on the fourth information.

In the apparatus according to the fifteenth aspect, the session management context information of the first network of the terminal device and/or the session management context information of the third network of the terminal device are/is deleted after the handover is completed, to release occupation of a network resource of the first network.

In a possible design, the fourth information is used to indicate that a handover of a voice service of the terminal device from the first network to the second network is completed. In the design, the handover of the voice service of the terminal device from the first network to the second network is to maintain continuity of the voice service.

In a possible design, the deletion unit includes a first deletion unit and/or a second deletion unit, where the first deletion unit is configured to delete session management context information of a voice service of the first network of the terminal device and/or session management context information of a non-voice service of the first network of the terminal device, and the second deletion unit is configured to delete session management context information of a voice service of the third network of the terminal device and/or session management context information of a non-voice service of the third network of the terminal device.

In a possible design, the apparatus further includes a determining unit configured to determine that supporting a handover of a non-voice service of the terminal device from the first network to the second network is not supported, or determine that returning of the terminal device from the second network to the first network is not supported.

In a possible design, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

In a possible design, that the handover of a non-voice service of the terminal device from the first network to the second network is not supported includes the simultaneous handover of the non-voice service from the first network to the second network in a process of handing over the voice service of the terminal device from the first network to the second network is not supported.

In a possible design, returning of the terminal device from the second network to the first network is not supported includes at least one or more of the terminal device, a device in the first network, a device in the second network, and a device in the third network do not support returning of the terminal device from the second network to the first network.

In a possible design, returning of the terminal device from the second network to the first network is not supported includes skipping the returning of the terminal device from the second network to the first network after the voice service of the second network ends is supported.

According to a sixteenth aspect, a network returning apparatus is provided. The apparatus includes a receiving unit configured to receive network identifier information from a mobility management network element in a third network, where the network identifier information is used to indicate that a terminal device is from a first network, and a triggering unit configured to trigger, based on the network identifier information, a base station controller in the second network to return the terminal device from the second network to the first network.

In the apparatus according to the sixteenth aspect, the terminal device is returned from the second network to the first network such that the first network provides a service for the terminal device, enhancing user experience.

In a possible design, the triggering unit is further configured to trigger, based on the network identifier information, the base station controller in the second network to return the terminal device from the second network to the first network when releasing a radio resource of the terminal device.

In a possible design, the triggering unit includes a sending unit configured to send the network identifier information to the base station controller in the second network.

In a possible design, the sending unit is further configured to send the network identifier information to the base station controller in the second network when sending a handover request message, a signaling connection establishment response, or a radio resource release request to the base station controller in the second network.

In a possible design, the apparatus further includes a determining unit configured to determine that returning of the terminal device from the second network to the first network is supported.

In a possible design, returning of the terminal device from the second network to the first network is supported includes at least one or more of the terminal device, a device in the first network, a device in the second network, and a device in the third network support returning of the terminal device from the second network to the first network.

In a possible design, returning of the terminal device from the second network to the first network is supported includes returning of the terminal device from the second network to the first network after the voice service of the second network ends is supported.

According to a seventeenth aspect, a computer-readable storage medium is provided. The computer-readable storage medium includes an instruction, when the instruction is run on a computer, the computer is enabled to perform any method provided in the first aspect, the second aspect, the third aspect, the fourth aspect, the fifth aspect, the sixth aspect, the seventh aspect, and the eighth aspect.

According to an eighteenth aspect, a computer program product including an instruction is provided. When the computer program product is run on a computer, the computer is enabled to perform any method provided in the first aspect, the second aspect, the third aspect, the fourth aspect, the fifth aspect, the sixth aspect, the seventh aspect, and the eighth aspect.

BRIEF DESCRIPTION OF DRAWINGS

To describe the technical solutions in some of the embodiments of this application more clearly, the following briefly describes the accompanying drawings describing the embodiments. The accompanying drawings in the following description show merely some embodiments of this application, and a person of ordinary skill in the art may derive other drawings from these accompanying drawings without creative efforts.

DESCRIPTION OF EMBODIMENTS

Figure 1:
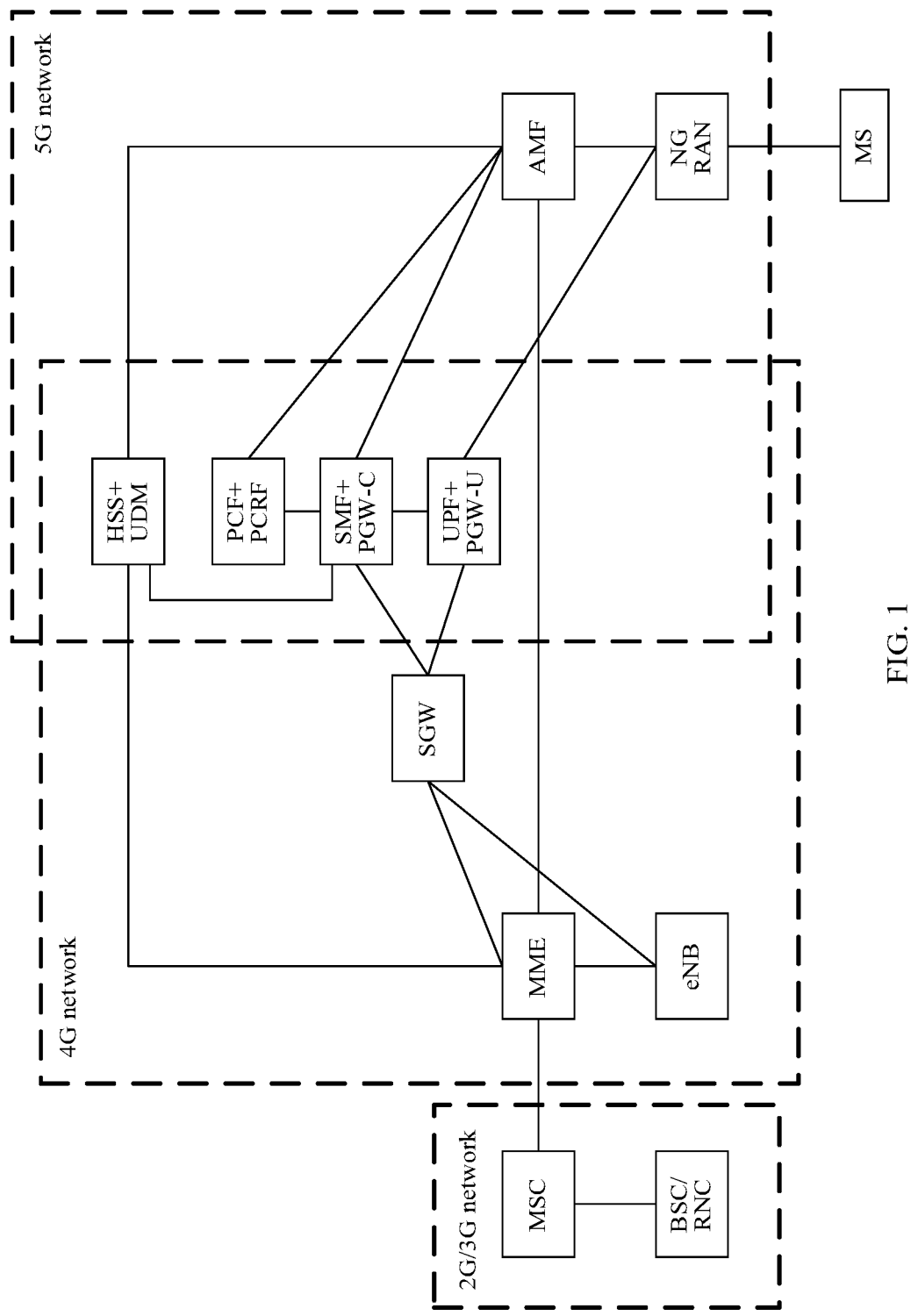
FIG. 1 is a schematic structural diagram of a communication system.

For ease of description of methods and apparatuses in the embodiments of this application, a wireless communications system to which the embodiments of this application are applied is first described using an example with reference to FIG. 1. It should be noted that FIG. 1 is an example for description. Any network element may be replaced with one or more other network elements according to development of wireless communications technologies, and any network element may be deployed on one or more physical entities. This is not limited in the embodiments of this application.

The method provided in the embodiments of this application may be applied to a wireless communications system. The wireless communications system includes a first network, a second network, and a third network. The first network, the second network, and the third network may be any three different networks in the following networks a second generation (2G) network, a third generation (3G) network, an EPS network (a commonly known 4G network), a 5G network, and a future wireless communications network. The 2G network may include a Global System for Mobile Communications (GSM) network, a code-division multiple access (CDMA) network, or a General Packet Radio Service (GPRS) network, the 3G network may include a CDMA2000 network, a wideband CDMA (WCDMA) network, a time division-synchronous CDMA (TD-SCDMA) network, or a Universal Mobile Telecommunications System (UMTS) network. For example, FIG. 1 is described using an example in which a first network is a 5G network, a second network is a network that supports a circuit-switched (CS) voice service, for example, a 2G network/3G network, and a third network is an EPS network.

In descriptions of this application, "/" means "or" unless otherwise specified. For example, A/B may represent A or B. In this application, "and/or" describes only an association relationship for describing associated objects and represents that three relationships may exist. For example, A and/or B may represent the following three cases only A exists, both A and B exist, and only B exists. In addition, in the descriptions of this application, "a plurality of" means two or more than two.

As shown in FIG. 1, the 5G network includes a (radio) access network ((R)AN) device, an AMF network element, a unified data management (UDM) network element, a policy control function (PCF) network element, a session management function (SMF) network element, and a user plane function (UPF) network element. The (R)AN device may be a next generation (NG) RAN device, or may be an Evolved Universal Terrestrial Radio Access Network (E-UTRAN) device.

The EPS network includes an E-UTRAN device, an MME network element, a serving gateway (SGW), a packet data network gateway (PGW), a policy and charging rules function (PCRF) network element, and a home subscriber server (HSS). The E-UTRAN device may be an evolved NodeB (eNodeB or eNB). The PGW may include a PGW-control plane (PGW-C) network element and a PGW-user plane (PGW-U) network element. Some network elements in the 5G network and some network elements in the EPS network may be deployed on a same physical entity such that the 5G network may interact with the EPS network. For example, as shown in FIG. 1, an HSS network element and a UDM network element are deployed on a same physical entity, a PCF network element and a PCRF network element are deployed on a same physical entity, an SMF network element and a PGW-C network element are deployed on a same physical entity, and an UPF network element and a PGW-U network element are deployed on a same physical entity. The network elements may alternatively be separate network elements. This is not limited in this embodiment of this application.

The 2G/3G network includes an MSC network element, a serving GPRS support node (SGSN), and a GPRS support node (GGSN) and further includes a base station controller (BSC) or a radio network controller (RNC).

As shown in FIG. 1, there is no interoperation interface between the 5G network and the 2G/3G network, there is an interoperation interface between the 5G network and the EPS network, and there is an interoperation interface between the EPS network and the 2G/3G network. Therefore, the 5G network may indirectly communicate with the 2G/3G network using the EPS network. Further, the AMF network element may communicate with the MME network element using an N26 interface, and the MME network element may communicate with the MSC network element through an Sv interface.

In the wireless communications system shown in FIG. 1, a terminal device may be referred to as a user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. Alternatively, the terminal device may be a station (ST) in a wireless local area network (WLAN), and may be a cellular phone, a cordless phone, a Session Initiation Protocol (SIP) phone, a wireless local loop (WLL) station, a personal digital assistant (PDA) device, a handheld device having a wireless communication function, a computing device, or another processing device connected to a wireless modem, a vehicle-mounted device, or a wearable device (which may also be referred to as a wearable intelligent device). Alternatively, the terminal device may be a terminal device in a next generation communications system, for example, a terminal device in 5G or a terminal device in a future evolved Public Land Mobile Network (PLMN), or a terminal device in a New Radio (NR) communications system.

In the wireless communications system shown in FIG. 1, the AMF network element may be responsible for registration, mobility management, a tracking area update procedure, and the like of the terminal device. The AMF network element may also be referred to as an AMF device or an AMF entity.

In the wireless communications system shown in FIG. 1, the SMF network element may be responsible for session management of the terminal device. For example, the session management includes selection of a user plane device, reselection of a user plane device, Internet Protocol (IP) address assignment, quality of service (QoS) control, and session establishment, modification, or release. The SMF network element may also be referred to as an SMF entity or an SMF device.

In the wireless communications system shown in FIG. 1, the PCF network element includes a policy control function and a flow-based charging control function. For example, the PCF network element may implement a policy control function, a charging policy control function, QoS control, and the like. The PCF network element may also be referred to as a PCF entity or a PCF device.

In the wireless communications system shown in FIG. 1, the MME network element may be responsible for authentication, mobility management, and session management of the terminal device. The MME network element may also be referred to as an MME device or an MME entity.

The foregoing network elements may be network elements implemented on dedicated hardware, or may be software instances run on dedicated hardware, or may be instances of virtualization functions on a proper platform. For example, the foregoing virtualization platform may be a cloud platform.

The following further describes a network handover method of a voice service provided in the embodiments of this application.

Figure 2:
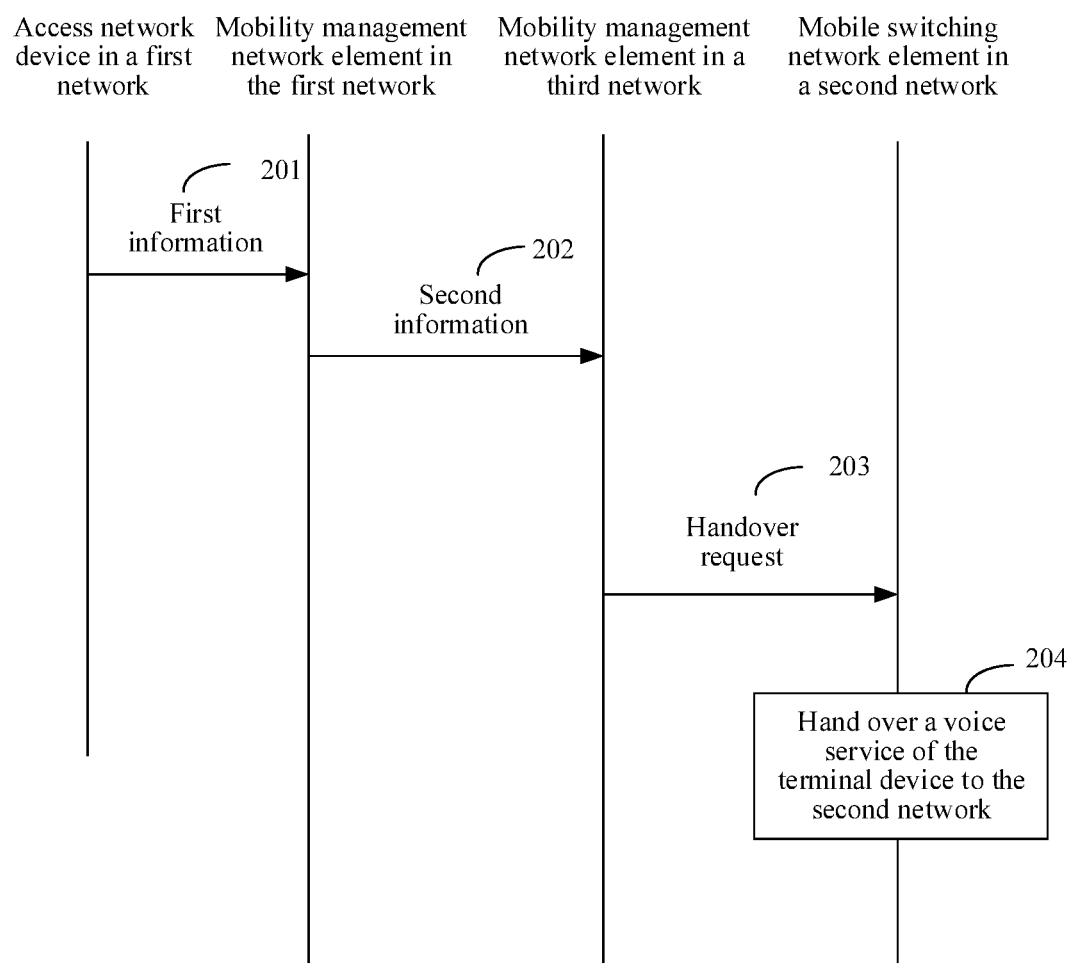
FIG. 2 is a schematic flowchart of an embodiment of a network handover method of a voice service according to this application.

Referring to FIG. 2, an embodiment of this application provides a method embodiment of a network handover method of a voice service. This embodiment may be applied to the wireless communications system shown in FIG. 1.

This embodiment includes the following steps.

201. An access network device in a first network sends first information to a mobility management network element in the first network, and correspondingly, the mobility management network element in the first network receives the first information from the access network device in the first network, where the first information is used to indicate a handover of a terminal device from the first network to a second network.

In an example scenario, the access network device in the first network receives a signal measurement report from the terminal device that conducts a voice service, and determines, based on the signal measurement report, that the terminal device leaves signal coverage of the first network and is in signal coverage of the second network, to determine that the voice service of the terminal device needs to be handed over from the first network to the second network. Therefore, the access network device in the first network sends the first information to the mobility management network element in the first network.

The first information may be used to indicate a handover of the voice service of the terminal device from the first network to the second network. Optionally, before sending the first information, the access network device determines that a QoS flow of the voice service of the terminal device is detected. It should be noted that in this embodiment of this application, the handover of the voice service of the terminal device from the first network to the second network may be a Single Radio Voice Call Continuity (SRVCC) handover, that is, a handover ensuring voice continuity.

In an optional embodiment, the first information includes a first identifier of a voice handover from the first network to the second network and/or a target identifier (ID) of the second network. Description is separately provided below. The first identifier of a voice handover is used to indicate the handover of the voice service of the terminal device from the first network to the second network, and may be an SRVCC handover indication (HO indication). The first identifier of a voice handover may be generated by the access network device in the first network. The target identifier of the second network is used to identify the second network to which the terminal device needs to be handed over, and may include a base station identifier of the second network, for example, a target RNC/BSC identifier, or a target cell identifier of the second network. The target identifier may be obtained by the access network device in the first network based on the received signal measurement report.

The first information may not be carried in any message, and is directly sent to the mobility management network element in the first network. Alternatively, the first information may be carried in a handover request (handover required) message or another message, and is sent to the mobility management network element in the first network. It should be noted that there is usually no interoperation interface between the first network and the second network. Therefore, the first network and the second network need to perform indirect communication using a third network, to implement the handover from the first network to the second network.

The following uses a wireless communications system shown in FIG. 1 as an example for description. The first network may be a 5G network, and the second network may be a network that supports a CS voice service, for example, is a 2G/3G network. The mobility management network element in the first network may be an AMF network element, and the access network device in the first network may be an (R)AN device, for example, is an NG-RAN device. After determining, based on the signal measurement report received from the terminal device, that the terminal device leaves signal coverage of the 5G network and is in signal coverage of the 2G/3G network, and detecting the QoS flow of the voice service, for example, detecting that a 5G QoS indication (5G QoS indicator (5QI))=1 QoS flow, the NG-RAN device sends a handover request message to the AMF network element, and the handover request message carries an SRVCC handover indication, or carries a target identifier of the 2G/3G network, or carries both an SRVCC handover indication and a target identifier of the 2G/3G network, to trigger a handover of the voice service of the terminal device from the 5G network to the 2G/3G network. A 2G/3G cell may be used as a neighboring cell of a 5G cell. The terminal device measures signal strength of the 5G cell and signal strength of the neighboring cell, generates a signal measurement report based on the measured signal strength, and sends the signal measurement report to the NG-RAN device.

After receiving the first information, the mobility management network element in the first network may determine, based on the first information, the handover of the terminal device from the first network to the second network. For example, the mobility management network element in the first network receives the handover request message, obtains the target identifier carried in the handover request message, and determines that the target identifier belongs to the second network. Therefore, the mobility management network element in the first network determines that the terminal device needs to be handed over from the first network to the second network. The mobility management network element in the first network may determine, based on the first information, that the handover is the handover of the voice service, to be specific, determine the handover of the voice service of the terminal device from the first network to the second network. For example, the mobility management network element in the first network determines that the handover request message carries the first identifier of a voice handover, and therefore determines that the voice service of the terminal device needs to be handed over from the first network to the second network. As an example, in the wireless communications system shown in FIG. 1, after receiving the handover request message sent by the NG-RAN device, the AMF network element may determine, based on the target identifier carried in the handover request message, that the target identifier belongs to the 2G/3G network. Therefore, it is determined that the terminal device needs to be handed over from the 5G network to the 2G/3G network. Alternatively, it may be determined, based on the SRVCC handover indication carried in the handover request message and/or the target identifier of the second network, that the voice service of the terminal device needs to be handed over from the 5G network to the 2G/3G network.

202. The mobility management network element in the first network sends second information to a mobility management network element in the third network based on the first information, and correspondingly, the mobility management network element in the third network receives the second information from the mobility management network element in the first network, where the second information is used to instruct the mobility management network element in the third network to send a handover request to a mobile switching network element in the second network.

In this embodiment of this application, after receiving the first information, the mobility management network element in the first network may send the second information to the mobility management network element in the third network based on the first information. The second information is used to instruct the mobility management network element in the third network to send the handover request to the mobile switching network element in the second network. The second information may not be carried in any message, and is directly sent to the mobility management network element in the third network. Alternatively, the second information may be carried in a relocation request message or another message, and is sent to the mobility management network element in the third network. The third network has an interoperation interface with both the first network and the second network. For example, when the first network is a 5G network, and the second network is a 2G/3G network, the third network may be an EPS network, and the mobility management network element in the third network may be an MME network element.

The second information may be information the same as the first information. As an example, in the wireless communications system shown in FIG. 1, the AMF network element obtains the SRVCC handover indication from the handover request message sent by the NG-RAN device, adds the SRVCC handover indication to the relocation request message, and sends the SRVCC handover indication to the MME network element. Alternatively, the second information may be information different from the first information. For example, the second information may be generated based on the first information. Still as an example, in the wireless communications system shown in FIG. 1, the AMF network element obtains the target identifier from the handover request message sent by the NG-RAN device, and determines that the target identifier belongs to the 2G/3G network, that is, determines that the voice service of the terminal device needs to be handed over from the 5G network to the 2G/3G network. Therefore, the SRVCC handover indication is generated, and the generated SRVCC handover indication is carried in the relocation request message and sent to the MME network element. The second information may be used to indicate the handover of the terminal device from the first network to the second network, and may be used to indicate the handover of the voice service, to be specific, used to indicate the handover of the voice service of the terminal device from the first network to the second network. Therefore, the second information may include a second identifier of a voice handover from the first network to the second network and/or the target identifier of the second network.

203. The mobility management network element in the third network sends the handover request to the mobile switching network element in the second network based on the second information, and correspondingly, the mobile switching network element in the second network receives the handover request from the mobility management network element in the third network.

After receiving the second information, the mobility management network element in the third network can determine the handover of the terminal device from the first network to the second network based on the second information, may determine that the handover is the handover of the voice service, and send the handover request to the mobile switching network element in the second network. The handover request is used to hand over the voice service of the terminal device to the second network. For example, the handover request may be a packet-switched to circuit-switched request (PS to CS request) message.

As an example, in the wireless communications system shown in FIG. 1, the MME network element obtains the SRVCC handover indication and/or the target identifier of the second network from the received relocation request message, determines, based on the SRVCC handover indication and/or the target identifier of the second network, the handover of the voice service of the terminal device from the 5G network to the 2G/3G network, and sends the packet-switched to circuit-switched request message to an MSC network element, where the packet-switched to circuit-switched request message is used to instruct to hand over the voice service of the terminal device to the 2G/3G network.

204. The mobile switching network element in the second network performs the handover of the voice service of the terminal device to the second network based on the handover request.

The handing over the voice service of the terminal device to the second network further includes two phases: a handover preparation phase and a handover execution phase, which are similar to a 4G SRVCC procedure defined in an existing standard protocol. For details, refer to 3rd Generation Partnership Project (3GPP) Technical Specification (TS) 23.216. In the handover preparation phase, a base station controller in the second network prepares an air interface resource, and returns a handover preparation response message to the mobility management network element in the first network using the mobile switching network element in the second network and the mobility management network element in the third network. The mobility management network element in the first network triggers, using the access network device in the first network, the terminal device to be handed over to the second network. In the handover execution phase, the base station controller in the second network detects that the terminal device is handed over to the second network, and sends, to the mobile switching network element in the second network, information indicating that the handover of the terminal device from the first network to the second network is completed. As an example, in the wireless communications system shown in FIG. 1, when the second network is a 2G/3G network supporting a CS voice service, in the handover preparation phase, the MSC network element sends a handover request message to an RNC/BSC network element, and the RNC/BSC network element prepares, based on the handover request message, a corresponding air interface resource for arrival of the CS voice service. After preparing the corresponding air interface resource, the RNC/BSC network element replies a handover acknowledgement (ack) message to the MSC network element to respond to the handover request message. The MSC network element sends a packet-switched to circuit-switched response (PS to CS response) message to the MME network element to respond to the PS to CS request message. The MME network element sends a relocation response message to the AMF network element, to respond to the relocation request message. The AMF network element sends a handover command message to the NG RAN device, to instruct the NG RAN device to hand over the terminal device to a destination base station controller or a destination cell of the 2G/3G network. The NG RAN device sends the handover command message to the terminal device, to trigger the terminal device to be handed over to the destination base station controller or the destination cell of the 2G/3G network. The handover preparation phase ends. In the handover execution phase, the RNC/BSC network element may detect that the terminal device accesses the destination base station controller or the destination cell of the 2G/3G network. The RNC/BSC network element sends a handover completion message to the MSC network element, to indicate that the handover of the terminal device from the first network to the second network is completed.

After the handover of the voice service is completed, the mobile switching network element in the second network may send first handover completion information to the mobility management network element in the third network, and the mobility management network element in the third network may send second handover completion information to the mobility management network element in the first network after receiving the first handover completion information. The first handover completion information is used to indicate that the handover of the voice service of the terminal device from the first network to the second network is completed, and the second handover completion indication information is used to indicate that the handover of the terminal device from the first network to the second network is completed, or is further used to indicate that the handover of the voice service of the terminal device from the first network to the second network is completed. The first handover completion information and/or the second handover completion information may carry an identifier of a voice handover from the first network to the second network, for example, the SRVCC handover indication. As an example, in the wireless communications system shown in FIG. 1, after determining, based on the handover completion message sent by the RNC/BSC network element, that the handover of the voice service of the terminal device from 5G to 2G/3G is completed, the MSC network element may send a packet-switched to circuit-switched completion (PS to CS complete) message to the MME network element. After receiving the packet-switched to circuit-switched completion message, the MME network element may send a relocation completion message to the AMF network element. Both the packet-switched to circuit-switched completion message and the relocation completion message may carry the SRVCC handover indication used to indicate that the handover of the voice service is completed. After the handover of the voice service is completed, the terminal device may be further registered with the 2G/3G network by sending a registration request. Further, after determining that the handover of the voice service is completed, the terminal device may send a route area update request (RAU request) and/or an attachment request (attach request) to an SGSN network element.

It can be learned that in this embodiment of this application, the voice service of the terminal device can be handed over from the first network to the second network through communication between the first network and the third network and communication between the third network and the second network, resolving a problem that the terminal device in the first network cannot implement the voice service. Further, the terminal device may be directly handed over from a cell of the first network to a cell of the second network, to execute the voice service in the second network, and does not need to be first handed over to a cell of the third network. For example, the terminal device is directly handed over from a 5G cell to a 2G/3G cell, and does not need to be first handed over to a 4G cell.

In an optional embodiment, when performing a handover, the mobile switching network element in the second network also needs to use information about the terminal device. Therefore, the mobility management network element in the first network may obtain the information, and send the information to the mobile switching network element in the second network using the mobility management network element in the third network. Therefore, the mobile switching network element in the second network performs the handover of the voice service based on the information about the terminal device. The information about the terminal device may include one or more of the following information: a classmark of the terminal device, information about a codec supported by the terminal device (supported codec), and subscription information used to hand over the voice service of the terminal device to the second network. The classmark of the terminal device may include a classmark 2 and/or a classmark 3 of the terminal device. The information about the codec supported by the terminal device may be further information about a codec of a CS voice service supported by the terminal device. The subscription information may include a Correlation-Mobile Station Integrated Services Digital Network (C-MSISDN) and/or a session transfer number for SRVCC (STN-SR). The information about the terminal device may be obtained by the mobility management network element in the first network. For example, the mobility management network element in the first network may obtain the information about the terminal device from a unified data management function network element or a subscription data register (for example, a UDM/HSS) in the first network. The subscription data register in the first network stores original subscription information (including the C-MSISDN and/or the STN-SR) of the terminal device, and may send the original subscription information to the mobility management network element in the first network in a process in which the terminal device is registered with the first network. The mobility management network element in the first network stores the subscription information. When the terminal device performs a registration procedure with an IP Multimedia Subsystem (IMS) network, an application server (for example, a service centralization and continuity (SCC) application server (AS)) in the IMS network obtains an updated STN-SR. The updated STN-SR may be generated by the application server or generated by an access transfer control function network element and sent to the application server. The application server sends the updated STN-SR to the subscription data register in the first network, and the subscription data register in the first network determines whether the updated STN-SR is the same as the STN-SR in the originally stored subscription information, and sends the updated STN-SR to the mobility management network element in the first network if the updated STN-SR is different from the STN-SR in the originally stored subscription information. The mobility management network element in the first network replaces the originally stored STN-SR with the updated STN-SR, and uses the updated STN-SR as a part of subscription data.

For example, in the wireless communications system shown in FIG. 1, the relocation request message sent by the AMF network element to the MME network element and the packet-switched to circuit-switched request message sent by the MME network element to the MSC network element further carry the information about the terminal device: a classmark, information about a supported codec, an STN-SR, and a C-MSISDN. The MSC network element hands over the voice service of the terminal device to the 2G/3G network based on the information about the terminal device.

In this embodiment of this application, after receiving the first information, the mobility management network element in the first network may further obtain session information of the third network of the terminal device from the session management network element in the first network, and send the session information of the third network to the mobility management network element in the third network. The session information of the third network includes a session management (SM) context of the voice service in the third network that is obtained after separation and/or SM context information of a non-voice service in the third network that is obtained after separation. The mobility management network element in the third network performs a corresponding operation based on the received information. The following provides descriptions using an embodiment.

Figure 3:
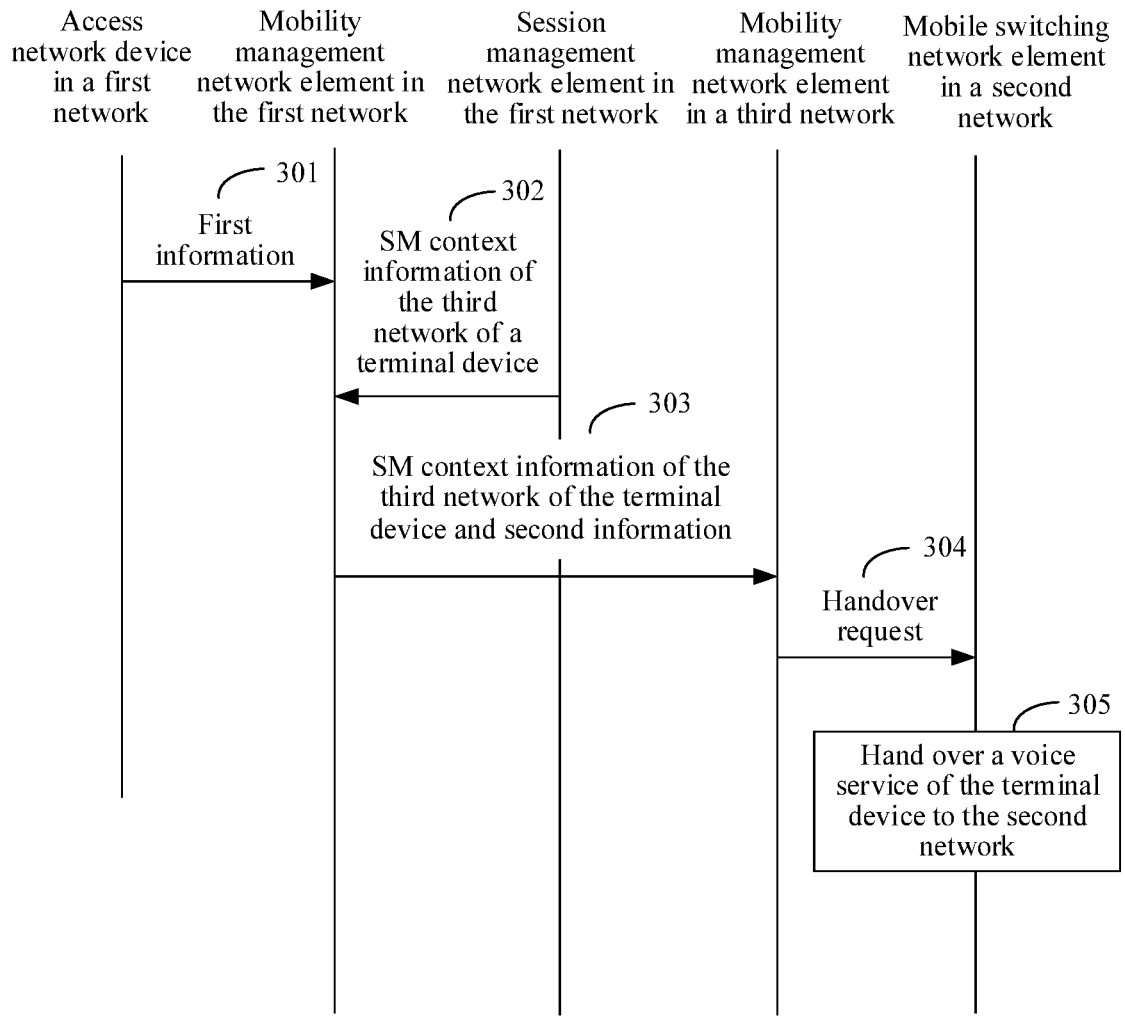
FIG. 3 is a schematic flowchart of an embodiment of a network handover method of a voice service according to this application.

Referring to FIG. 3, an embodiment of this application provides another method embodiment of a network handover method of a voice service. This embodiment may be applied to the wireless communications system shown in FIG. 1.

This embodiment includes the following steps.

301. An access network device in a first network sends first information to a mobility management network element in the first network, and correspondingly, the mobility management network element in the first network receives the first information from the access network device in the first network, where the first information is used to indicate a handover of a terminal device from the first network to a second network.

For related content of 301, refer to the descriptions of 201 in the embodiment corresponding to FIG. 2. Details are not described herein again.

302. The mobility management network element in the first network obtains SM context information in a third network of the terminal device from a session management network element in the first network based on the first information.

303. The mobility management network element in the first network sends second information and the obtained SM context information in the third network of the terminal device to a mobility management network element in the third network based on the first information, and correspondingly, the mobility management network element in the third network receives the second information and the SM context information in the third network of the terminal device from the mobility management network element in the first network.

For related content of sending the second information, refer to the descriptions of 202 in the embodiment corresponding to FIG. 2. Details are not described herein again. The following describes processes of obtaining and sending a session management context in 302 and 303.

In this embodiment of this application, it is determined based on the first information that the terminal device needs to be handed over from the first network to the second network such that an operation of obtaining the SM context information in the third network of the terminal device from the session management network element in the first network can be performed. The following describes an example case of obtaining the SM context information in the third network of the terminal device.

In a first case, the session management network element in the first network does not perform any separation operation, and unseparated SM context information in the third network of the terminal device is obtained from the mobility management network element in the first network.

The mobility management network element in the first network sends, to the session management network element in the first network, a request used to obtain the SM context information, for example, an SM context request or an SM context service invoking request. The session management network element in the first network obtains the SM context information in the third network of the terminal device, returns the SM context information in the third network of the terminal device to the mobility management network element in the first network. The mobility management network element in the first network sends the received SM context information in the third network of the terminal device to the mobility management network element in the third network. The SM context information in the third network of the terminal device includes SM context information of a voice service and SM context information of a non-voice service in the third network of the terminal device. The SM context information in the third network of the terminal device may be obtained based on the SM context information in the first network of the terminal device. As an example, in the communications system shown in FIG. 1, an AMF network element sends an SM context request to an SMF network element, and the SMF network element receives an SM context request, obtains SM context information in 4G network of the terminal device that is stored by the SMF network element, and sends the SM context information in 4G network of the terminal device to the AMF network element. After receiving the SM context information in 4G network of the terminal device, the AMF network element forwards the SM context information to an MME network element. Both the SM context information in 4G network of the terminal device and the second information may be carried in a relocation request message sent to the MME network element. The SM context information in 4G network of the terminal device is obtained based on SM context information in 5G network of the terminal device.

In a second case, the session management network element in the first network performs a separation operation on the SM context information in the third network of the terminal device, and the mobility management network element in the first network obtains, from the session management network element in the first network, SM context information of a voice service and/or a non-voice service that is obtained after separation.

The mobility management network element in the first network sends third information to the session management network element in the first network. The third information may be carried in an SM context request, an SM context service invoking request, or another request used to obtain SM context information, and the third information is used to indicate the handover of the terminal device from the first network to the second network. The session management network element in the first network performs a separation operation on the SM context information in the third network of the terminal device based on the third information, to obtain session information obtained after separation, where the session information obtained after separation includes the SM context information of the voice service in the third network of the terminal device and/or the SM context information of the non-voice service in the third network of the terminal device, and sends, to the session management network element in the first network, the session information obtained after separation.

Similar to the first information and the second information, the third information may be used to indicate a handover of the voice service of the terminal device from the first network to the second network, and may include a third identifier of a voice handover from the first network to the second network and/or a target identifier of the second network. The separated SM context information may not be carried in any message and directly sent to the mobility management network element in the first network, or may be carried in an SM context response, a session context service invoking response, or another message and sent to the mobility management network element in the first network. The SM context information in the third network of the terminal device may be obtained by the session management network element based on the SM context information in the first network of the terminal device.

As an example, in the communications system shown in FIG. 1, the AMF network element sends an SM context request to the SMF network element. The SM context request carries an SRVCC handover indication. The SMF network element obtains, according to the SRVCC handover indication, SM context information in 4G network of the terminal device that is stored by the SMF network element, performs a separation operation on the SM context information in 4G network of the terminal device, to obtain separated SM context information, where the separated SM context information includes SM context information of a voice service in 4G network of the terminal device and/or SM context information of a non-voice service in 4G network of the terminal device, and sends the separated SM context information to the AMF network element. The AMF network element forwards the separated SM context information to the MME network element after receiving the separated SM context information. Both the separated SM context information and the second information may be carried in a relocation request message sent to the MME network element. The SM context information in 4G network of the terminal device may be obtained based on SM context information in 5G network of the terminal device.

304. The mobility management network element in the third network sends a handover request to a mobile switching network element in the second network based on the second information and the SM context information in the third network of the terminal device, where the handover request is used to hand over a voice service of the terminal device to the second network.

In addition to the second information, the mobility management network element in the third network further receives the SM context information in the third network of the terminal device, and performs corresponding different operations based on the SM context information in the third network of the terminal device. Descriptions are separately provided below.

In a first case, the mobility management network element in the third network receives the second information and unseparated SM context information in the third network of the terminal device.

The mobility management network element in the third network performs a separation operation on the unseparated SM context information in the third network of the terminal device, to obtain SM context information of a voice service in the third network of the terminal device that is obtained after separation, determines the handover of the voice service of the terminal device from the first network to the second network based on the SM context information of the voice service and the second information, and sends the handover request to the mobile switching network element in the second network. For example, if the MME network element receives the unseparated SM context information in 4G network of the terminal device and the SRVCC handover indication, the MME network element performs a separation operation on the SM context information in 4G network of the terminal device, to obtain SM context information of a voice service in 4G network of the terminal device that is obtained after separation, determines, based on the SM context information of the voice service in 4G network and the SRVCC handover indication, the handover of the voice service of the terminal device from the first network to the second network, and sends a packet-switched to circuit-switched request message to the MSC network element.

In a second case, the mobility management network element in the third network receives the second information and SM context information of a voice service in the third network of the terminal device that is obtained after separation.

The mobility management network element in the third network determines, based on the second information and the SM context information of the voice service in the third network of the terminal device that is obtained after separation, the handover of the voice service of the terminal device from the first network to the second network, and sends a handover request to the mobile switching network element in the second network.

In a third case, the mobility management network element in the third network receives the second information and SM context information of a non-voice service in the third network of the terminal device that is obtained after separation.

The mobility management network element in the third network determines, based on the second information, the handover of the voice service of the terminal device to the second network, and determines, based on the SM context information of the non-voice service in the third network of the terminal device, a handover of the non-voice service of the terminal device to the second network. That is, when the voice service of the terminal device is handed over from the first network to the second network, the non-voice service of the terminal device needs to be synchronously handed over from the first network to the second network. Therefore, the mobility management network element in the third network sends the handover request to the mobile switching network element in the second network, and triggers the handover of the non-voice service of the terminal device to the second network.

For example, if the MME network element receives the SM context information of the non-voice service in 4G network of the terminal device that is obtained after separation and the SRVCC handover indication, the MME network element may determine, according to the SRVCC handover indication, that the voice service of the terminal device needs to be handed over to the 2G/3G network, and determine, based on the SM context information of the non-voice service in 4G network, that the non-voice service of the terminal device needs to be handed over to the 2G/3G network in a process of handing over the voice service of the terminal device to the 2G/3G network. In addition to sending the packet-switched to circuit-switched request message to the MSC network element to trigger the handover of the voice service to the 2G/3G network, the MME network element further sends a forward relocation request to the SGSN network element to trigger the handover of the non-voice service to the 2G/3G network.

In a fourth case, the mobility management network element in the third network receives the second information, SM context information of a non-voice service in the third network of the terminal device that is obtained after separation, and SM context information of a voice service in the third network of the terminal device that is obtained after separation.

The mobility management network element in the third network determines, based on the second information and the SM context information of the voice service in the third network of the terminal device that is obtained after separation, the handover of the voice service of the terminal device from the first network to the second network, and determines, based on the SM context information of the non-voice service in the third network of the terminal device, the handover of the non-voice service of the terminal device to the second network. The mobility management network element in the third network sends a handover request to the mobile switching network element in the second network, and triggers an operation of handing over the non-voice service of the terminal device to the second network. For related content of the fourth case, refer to descriptions of the second case and the third case. Details are not described herein again.

305. The mobile switching network element in the second network receives the handover request sent by the mobility management network element in the third network and hands over the voice service of the terminal device to the second network based on the handover request.

For related content of 305, refer to the descriptions of 204 in the embodiment corresponding to FIG. 2. Details are not described herein again.

In a network handover process of a terminal device in the other approaches, a mobility management network element in a source network needs to obtain SM context information of the terminal device from a session management network element in the source network, and send the obtained SM context information to a mobility management network element in a target network such that the SM context information of the terminal device is handed over from the source network to the target network. However, in the foregoing embodiment, because the terminal device is to be handed over to the second network that supports a CS voice service, the SM context information of an original PS voice service in the first network of the terminal device cannot be directly used to map or generate SM context information of the CS voice service in the second network. Therefore, the mobility management network element in the first network does not need to obtain the SM context information of the voice service from the session management network element in the first network. In addition, because a network may configure, by default, that the handover of the non-voice service of the terminal device from the first network to the second network is not supported, the mobility management network element in the first network does not need to obtain the SM context information of the non-voice service from the session management network element. In conclusion, the mobility management network element in the first network may skip an operation of obtaining the SM context information of the terminal device from the session management network element in the first network, or the session management network element in the first network may skip an operation of sending the SM context information to the terminal device, reducing signaling overheads. Details are described below.

Figure 5:
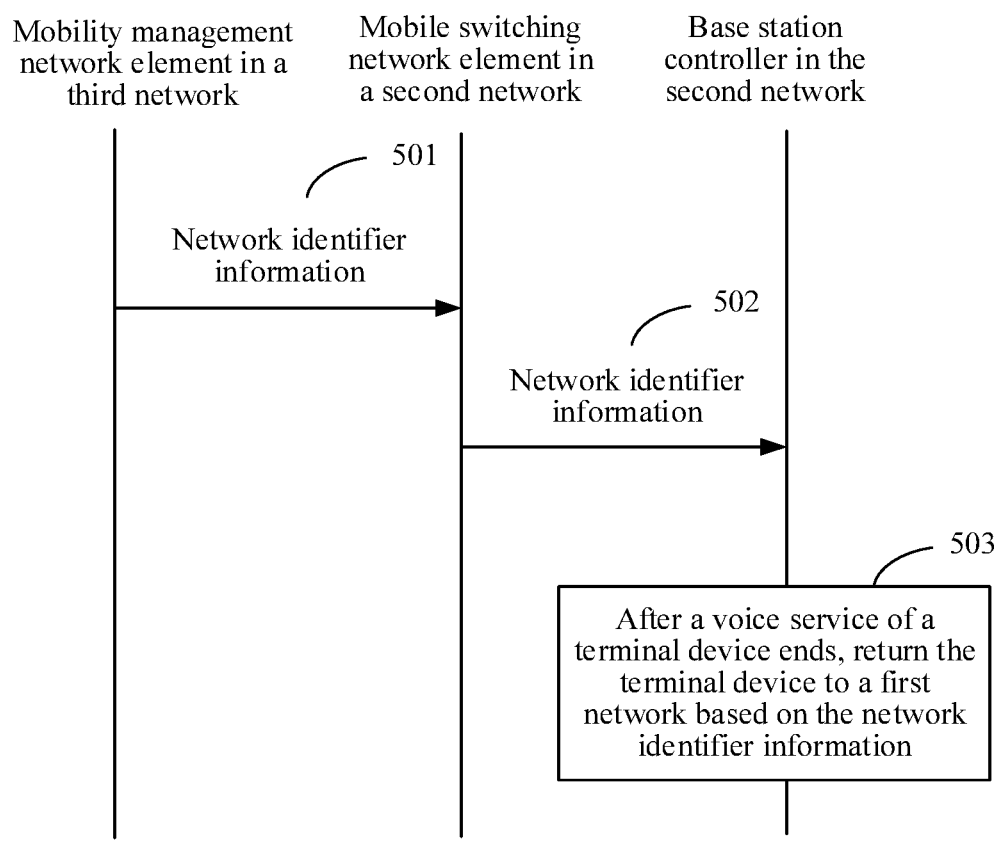
FIG. 5 is a schematic flowchart of an embodiment of another network returning method according to this application.

In an optional embodiment, the mobility management network element in the first network determines whether the handover is the handover of the terminal device from the first network to the second network, where the second network is a network that supports a CS voice service. If the handover is a handover of the terminal device from the first network to the second network, skips an operation of obtaining the SM context information in the third network of the terminal device from the session management network element in the first network in 302. And the mobility management network element in the first network will not receive any SM context information from the session management network element in the first network. For example, as shown in FIG. 5, the AMF network element receives the handover request message from the NG RAN device, if the first information carried in the handover request message is a target 2G/3G cell identifier or a target RNC/BSC identifier, the AMF network element determines that the handover is a handover of the terminal device from the 5G network to the 2G/3G network, and thus skips an operation of sending an SM context request to the SMF network element. In the design, it may be considered by default through network configuration that the handover of the terminal device from the first network to the second network is to ensure continuity of the voice service. That is, the mobility management network element in the first network only needs to determine that the terminal device is to be handed over to the second network and does not need to determine that the handover is the handover of the voice service from the first network to the second network, that is, may skip an operation of obtaining the SM context information in the third network of the terminal device.

Further, the mobility management network element in the first network may determine that the handover is the handover of the voice service, that is, determine the handover of the voice service of the terminal device from the first network to the second network, and thus skip an operation of obtaining the SM context information in the third network of the terminal device.

In another optional embodiment, the mobility management network element in the first network determines whether the handover of the non-voice service of the terminal device from the first network to the second network is supported, and if the handover of the non-voice service of the terminal device from the first network to the second network is not supported, skips an operation of obtaining the SM context information in the third network of the terminal device from the session management network element in the first network in 302, to receive no SM context information returned by the session management network element in the first network. Whether the handover of the non-voice service of the terminal device from the first network to the second network is supported may indicate whether at least one or more of the terminal device, a device in the first network, a device in the second network, and a device in the third network support the handover of the non-voice service of the terminal device from the first network to the second network. For example, the AMF network element determines whether the terminal device, the AMF network element, the MME network element, and the MSC network element cooperate with each other to support the handover of the non-voice service of the terminal device from the 5G network to the 2G/3G network. If the handover of the non-voice service of the terminal device from the 5G network to the 2G/3G network is supported, the AMF network element sends an SM context request to the SMF network element, where the SM context request may carry third information, if the handover of the non-voice service of the terminal device from the 5G network to the 2G/3G network is not supported, the AMF network element skips an operation of sending the SM context request. Further, whether the handover of the non-voice service of the terminal device from the first network to the second network is supported may mean: whether execution of the handover of the non-voice service from the first network to the second network is supported in a process of handing over the voice service of the terminal device from the first network to the second network. For example, the AMF network element determines whether the terminal device, the AMF network element, the MME network element, and the MSC network element cooperate with each other, to support execution of the handover of the non-voice service of the terminal device to the 2G/3G network in a process of handing over the voice service of the terminal device from the 5G network to the 2G/3G network.

Correspondingly, the session management network element in the first network may skip an operation of sending the SM context information. Details are described below.

In an optional embodiment, the session management network element in the first network may determine, depending on whether the third information is received, whether the handover is the handover of the voice service of the terminal device from the first network to the second network, where the second network is a network that supports a CS voice service. If the handover is the handover of the voice service of the terminal device from the first network to the second network, the session management network element in the first network may skip an operation of sending the SM context information to the session management network element in the first network, that is, the session management network element in the first network does not send the SM context information to the mobility management network element in the first network, or the session management network element in the first network sends, to the mobility management network element in the first network, a message without the SM context information. For example, the SMF network element receives an SM context request or an SM context service invoking request, if the SM context request or the SM context service invoking request carries the third information, the SMF network element does not send the SM context information to the AMF network element, or sends, to the AMF network element, a message without the SM context information.

In another optional embodiment, the session management network element in the first network may determine whether the handover of the non-voice service of the terminal device from the first network to the second network is supported, and, may skip an operation of sending the SM context information to the mobility management network element in the first network if the handover of the non-voice service of the terminal device from the first network to the second network is not supported, and, sends the SM context information to the mobility management network element in the first network if the handover of the non-voice service of the terminal device from the first network to the second network is supported, where the SM context information includes SM context information of the non-voice service. Further, determining whether the handover of the non-voice service of the terminal device from the first network to the second network is supported may be further determining whether execution of the handover of the non-voice service from the first network to the second network is supported in a process of handing over the voice service of the terminal device from the first network to the second network. In addition, whether the handover of the non-voice service of the terminal device from the first network to the second network is supported may indicate whether at least one or more of the terminal device, a device in the first network, a device in the second network, and a device in the third network support the handover of the non-voice service of the terminal device from the first network to the second network. For example, the SMF network element determines whether the terminal device, the AMF network element, the MME network element, and the MSC network element cooperate with each other to support the handover of the non-voice service of the terminal device from the 5G network to the 2G/3G network, sends the SM context information to the AMF network element if the handover of the non-voice service of the terminal device from the 5G network to the 2G/3G network is supported, and, skips an operation of sending the SM context information if the handover of the non-voice service of the terminal device from the 5G network to the 2G/3G network is not supported.

If the terminal device does not support the synchronous handover of the non-voice service in the process of the handover from the first network to the second network, the SM context information of the non-voice service cannot be handed over to the second network. If execution of a registration area update procedure performed by the terminal device from the first network to the second network is not supported, the SM context information of the non-voice service cannot be transferred to the second network. Therefore, in this embodiment of this application, a deletion operation or a suspension operation may be performed on the SM context information of the non-voice service based on availability of the SM context information of the non-voice service, to release occupation of a network resource of the first network. The following provides descriptions using an embodiment.

Figure 4:
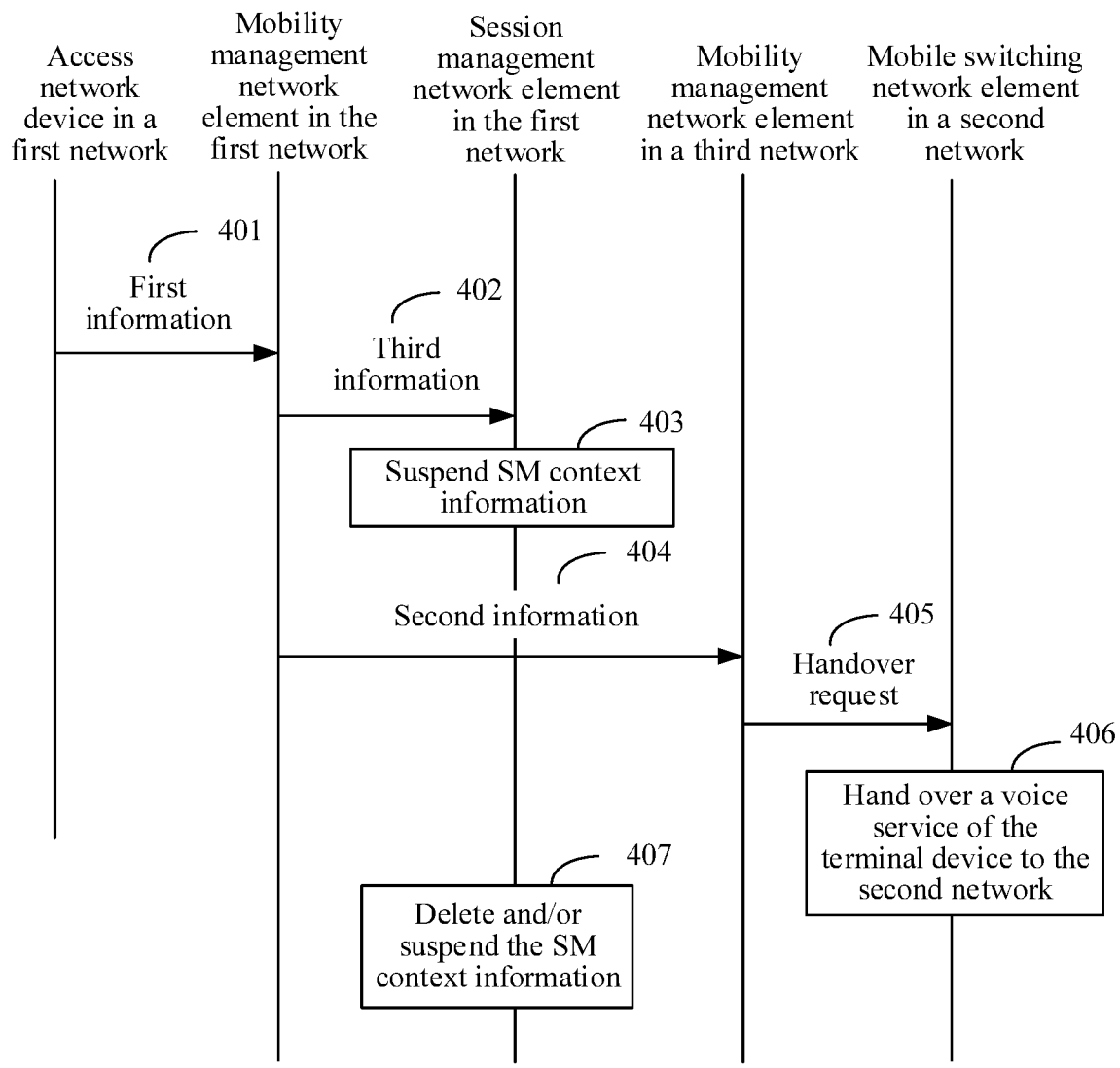
FIG. 4 is a schematic flowchart of an embodiment of another network handover method of a voice service according to this application.

Referring to FIG. 4, an embodiment of this application provides another method embodiment of a network handover method of a voice service. This embodiment may be applied to the wireless communications system shown in FIG. 1.

This embodiment includes the following steps.

401. An access network device in a first network sends first information to a mobility management network element in the first network, and correspondingly, the mobility management network element in the first network receives the first information from the access network device in the first network, where the first information is used to indicate a handover of a terminal device from the first network to a second network.

For related content of 401, refer to the descriptions of 201 in the embodiment corresponding to FIG. 2. Details are not described herein again.

402. The mobility management network element in the first network sends third information to a session management network element in the first network based on the first information.

The third information is used to indicate the handover of the terminal device from the first network to the second network. Further, the third information is used to indicate a handover of a voice service, that is, a handover of a voice service of the terminal device from the first network to the second network.

403. The session management network element in the first network suspends a non-voice service of the first network of the terminal device and/or a non-voice service of a third network of the terminal device based on the third information.

The suspending a non-voice service of the first network of the terminal device includes suspending SM context information of the non-voice service in the first network of the terminal device, and another operation. Before suspending the SM context information of the non-voice service in the first network of the terminal device, the session management network element in the first network may further perform a separation operation on the SM context information in the first network of the terminal device, to obtain SM context information of the non-voice service in the first network of the terminal device that is obtained after separation. The suspending a non-voice service of a third network of the terminal device includes suspending SM context information of the non-voice service in the third network of the terminal device, and another operation. Before suspending the SM context information of the non-voice service of the third network of the terminal device, the session management network element in the first network may further perform a separation operation on the SM context information in the third network of the terminal device, to obtain SM context information of the non-voice service in the third network of the terminal device that is obtained after separation.

Suspending the non-voice service refers to reserving and not deleting all or a part of an SM context of the non-voice service, for example, reserving all service flows related to the non-voice service, or reserving a non-guaranteed bit rate (non-GBR) flow related to the non-voice service and deleting a guaranteed bit rate (GBR) flow related to the non-voice service. It should be noted that, in addition to reserving and not deleting all or a part of the SM context of the non-voice service, the mobility management network element in the first network may further perform some corresponding operations to complete a procedure for suspending the non-voice service. For example, the operations include but are not limited to setting each suspended non-voice service flow to a suspended state, sending a suspension notification to a user plane function network element, triggering to release a user plane resource established by the first network for the terminal device, and sending a suspension notification to a policy and charging function network element. After receiving the suspension notification, the user plane function network element may buffer or discard a data packet of a suspended non-voice service flow. After receiving the suspension notification, the policy charging function network element may perform corresponding traffic statistics collection, or send a suspension notification to a service server of a corresponding non-voice service such that the service server can pause sending of a data packet of a downlink non-voice service.

In an optional embodiment, before the session management network element in the first network suspends the non-voice service of the first network of the terminal device and/or the non-voice service of the third network of the terminal device, the session management network element in the first network may determine whether the handover of the non-voice service of the terminal device from the first network to the second network is supported, suspend the non-voice service of the first network of the terminal device and/or the non-voice service of the third network of the terminal device if the handover of the non-voice service of the terminal device from the first network to the second network is not supported, and skip suspending the non-voice service of the first network of the terminal device and/or the non-voice service of the third network of the terminal device if the handover of the non-voice service of the terminal device from the first network to the second network is supported. Further, the determining whether the handover of the non-voice service of the terminal device from the first network to the second network is supported may be determining whether execution of the handover of the non-voice service from the first network to the second network is supported in a process of handing over the voice service of the terminal device from the first network to the second network. Whether the handover of the non-voice service of the terminal device from the first network to the second network is supported may indicate whether at least one or more of the terminal device, a device in the first network, a device in the second network, and a device in the third network support the handover of the non-voice service of the terminal device from the first network to the second network. For example, the SMF network element determines whether the UE, the AMF network element, the MME network element, and the MSC network element cooperate with each other to support the handover of the non-voice service of the terminal device from the 5G network to the 2G/3G network.

In another optional embodiment, before the session management network element in the first network suspends the non-voice service of the first network of the terminal device and/or the non-voice service of the third network of the terminal device, the session management network element in the first network determines whether returning of the terminal device from the second network to the first network is supported, and suspends the non-voice service of the first network of the terminal device and/or the non-voice service of the third network of the terminal device if the returning of the terminal device from the second network to the first network is supported. Determining whether returning of the terminal device from the second network to the first network is supported may be determining whether the returning of the terminal device from the second network to the first network is supported after the voice service of the terminal device in the second network ends. Whether returning of the terminal device from the second network to the first network is supported may mean whether at least one or more of the terminal device, a device in the first network, a device in the second network, and a device in the third network support the returning from the second network to the first network. For example, the SMF network element determines whether UE, the AMF network element, the MME network element, and the MSC network element cooperate with each other to support returning of the terminal device from the 5G network to the 2G/3G network.

404. The mobility management network element in the first network sends second information to a mobility management network element in the third network based on the first information, and correspondingly, the mobility management network element in the third network receives the second information from the mobility management network element in the first network, where the second information is used to instruct the mobility management network element in the third network to send a handover request to a mobile switching network element in the second network.

405. The mobility management network element in the third network sends a handover request to the mobile switching network element in the second network based on the second information.

406. The mobile switching network element in the second network receives the handover request sent by the mobility management network element in the third network and hands over the voice service of the terminal device to the second network based on the handover request.

After the handover of the voice service is completed, the mobile switching network element in the second network may send first handover completion information to the mobility management network element in the third network, and the mobility management network element in the third network may send second handover completion information to the mobility management network element in the first network after receiving the first handover completion information.

For related content of 404, 405, and 406, refer to the descriptions of 202, 203, and 204 in the embodiment corresponding to FIG. 2. Details are not described herein again. A sequence of performing 402 and 404 is not limited. For example, 402 may be performed before 404, or 404 may be performed before 402.

407. After the handover of the terminal device from the first network to the second network is completed, the session management network element in the first network deletes and/or suspends the SM context information in the session management network element in the first network. Details are described below.

In a first case, the mobility management network element in the first network instructs the session management network element in the first network to delete the SM context information.

Further, after determining that the handover of the terminal device from the first network to the second network is completed, the mobility management network element in the first network sends a session deletion request to the session management network element in the first network, where the session deletion request is used to request the session management network element in the first network to delete a session of the first network of the terminal device and/or a session of the third network of the terminal device. The session management network element in the first network deletes the session of the first network of the terminal device and/or the session of the third network of the terminal device based on the session deletion request. For example, after determining that the handover of the terminal device to the 2G/3G network is completed, the AMF network element sends a protocol data unit (PDU) session release message to the SMF network element, or invokes a session deletion/update service from the SMF network element and triggers the SMF network element to delete a 5G PDU session of the terminal device and/or a packet data network (PDN) session of the 4G network. The SMF network element deletes 5G SM context information and/or 4G SM context information of the terminal device based on the PDU session release message or by invoking the session deletion/update service from the SMF network element. It should be noted herein that, that the session management network element in the first network deletes the SM context information related to the terminal device is merely some operations of a session deletion procedure, and the SMF may further need to perform another operation to complete the session deletion procedure, for example, releasing an IP address assigned to the UE, instructing to delete a corresponding user plane resource, and notifying the AMF network element whether session release is completed. This is not limited herein. In the design, the mobility management network element in the first network may determine, based on second handover completion information received from the mobility management network element in the third network, that the handover of the terminal device from the first network to the second network is completed. For example, the AMF may determine, based on the relocation complete message received from the MME network element, that the handover of the terminal device from the 5G network to the 2G/3G network is completed.

In another design, when the mobility management network element in the first network sends the session deletion request to the session management network element in the first network, the session deletion request may further carry information about a reason why a session is deleted, and the cause information is used to indicate, to the session management network element in the first network, a specific reason why a session of the terminal device is deleted. For example, the cause information may include but is not limited to information indicating that the handover of the terminal device from the first network to the second network is completed or information indicating the handover of the terminal device from the first network to the second network. The information indicating that the handover of the terminal device from the first network to the second network is completed may include information indicating that the handover of the voice service of the terminal device from the first network to the second network is completed, the information indicating the handover of the terminal device from the first network to the second network may include information indicating the handover of the terminal device from the first network to the second network due to the voice service, and the like. For information about an operation of deleting the session of the terminal device based on the cause information in the session deletion request by the session management network element in the first network, refer to the foregoing descriptions.

In a second case, the mobility management network element in the first network sends, to the session management network element in the first network, fourth information indicating that a handover is completed, and the session management network element in the first network deletes the SM context information based on the fourth information.

The mobility management network element in the first network sends the fourth information to the session management network element in the first network, where the fourth information is used to indicate that the handover of the terminal device from the first network to the second network is completed. The fourth information is further used to indicate that the handover of the voice service of the terminal device from the first network to the second network is completed. After receiving the fourth information, after determining, based on the fourth information, that the handover of the terminal device from the first network to the second network is completed, the session management network element in the first network deletes SM context information in the first network and/or SM context information in the third network of the terminal device. The deleting SM context information in the first network of the terminal device includes deleting SM context information of a voice service in the first network of the terminal device and/or SM context information of a non-voice service in the first network of the terminal device. The deleting SM context information in the third network of the terminal device includes deleting SM context information of a voice service in the third network of the terminal device and/or SM context information of a non-voice service in the third network of the terminal device. Before deleting the SM context information in the first network of the terminal device, the session management network element in the first network may further perform a separation operation on the SM context information in the first network of the terminal device based on the third information or the fourth information, to obtain SM context information of a voice service and/or SM context information of a non-voice service in the first network of the terminal device that are/is obtained after separation. Before deleting the SM context information in the third network of the terminal device, the session management network element in the third network may further perform a separation operation on the SM context information in the third network of the terminal device based on the third information or the fourth information, to obtain SM context information of a voice service and/or SM context information of a non-voice service in the third network of the terminal device that are/is obtained after separation.

In an optional embodiment, before deleting the SM context information of the non-voice service in the first network of the terminal device and/or the SM context information of the non-voice service in the third network of the terminal device, the session management network element in the first network may further determine whether the handover of the non-voice service of the terminal device from the first network to the second network is supported, perform a deletion operation if the handover of the non-voice service of the terminal device from the first network to the second network is not supported, and skip the delete operation if the handover of the non-voice service of the terminal device from the first network to the second network is supported. Further, the determining whether the handover of the non-voice service of the terminal device from the first network to the second network is supported may be further determining whether execution of the handover of the non-voice service from the first network to the second network is supported in a process of handing over the voice service of the terminal device from the first network to the second network. Whether the handover of the non-voice service of the terminal device from the first network to the second network is supported may indicate whether at least one or more of the terminal device, a device in the first network, a device in the second network, and a device in the third network support the handover of the non-voice service of the terminal device from the first network to the second network. For example, the SMF network element determines whether the terminal device, the AMF network element, the MME network element, and the MSC network element cooperate with each other to support the handover of the non-voice service of the terminal device from the 5G network to the 2G/3G network.

In another optional embodiment, before deleting the SM context information of the non-voice service in the first network of the terminal device and/or the SM context information of the non-voice service in the third network of the terminal device, the session management network element in the first network may further determine whether the returning of the terminal device from the second network to the first network is supported, perform a deletion operation if the returning of the terminal device from the second network to the first network is not supported, and skip the delete operation if the returning of the terminal device from the second network to the first network is supported. Determining whether returning of the terminal device from the second network to the first network is supported may be further determining whether the returning of the terminal device from the second network to the first network is supported after the voice service of the terminal device in the second network ends. Whether returning of the terminal device from the second network to the first network is supported may mean whether at least one or more of the terminal device, a device in the first network, a device in the second network, and a device in the third network support the returning of the terminal device from the second network to the first network. For example, the SMF network element determines whether the terminal device, the AMF network element, the MME network element, and the MSC network element cooperate with each other, to support returning of the terminal device from the second network to the first network.

In a third case, the mobility management network element in the first network sends, to the session management network element in the first network, fourth information indicating that a handover is completed, and the session management network element in the first network suspends a non-voice service of the terminal device based on the fourth information.

The mobility management network element in the first network sends the fourth information to the session management network element in the first network, where the fourth information is used to indicate that the handover of the terminal device from the first network to the second network is completed. The fourth information is further used to indicate that the handover of the voice service of the terminal device from the first network to the second network is completed. The session management network element in the first network suspends a non-voice service of the first network and/or a non-voice service of the third network of the terminal device after receiving the fourth information.

The suspending a non-voice service of the first network of the terminal device includes suspending SM context information of the non-voice service in the first network of the terminal device, and another operation. Before suspending the SM context information of the non-voice service in the first network, the session management network element in the first network may further perform a separation operation on the SM context information in the first network of the terminal device based on the third information or the fourth information, to obtain SM context information of the non-voice service in the first network of the terminal device that is obtained after separation. The suspending a non-voice service of the third network of the terminal device includes suspending SM context information of the non-voice service in the third network of the terminal device, and another operation. Before suspending the SM context information of the non-voice service in the third network, the session management network element in the third network may further perform a separation operation on the SM context information in the third network of the terminal device based on the third information or the fourth information, to obtain SM context information of the non-voice service in the third network of the terminal device that is obtained after separation.

Suspending the non-voice service refers to reserving and not deleting all or a part of an SM context of the non-voice service, for example, reserving all service flows related to the non-voice service, or reserving a non-GBR flow related to the non-voice service and deleting a GBR flow related to the non-voice service. It should be noted that, in addition to reserving and not deleting all or a part of the SM context of the non-voice service, the mobility management network element in the first network may further perform some corresponding operations to complete a procedure for suspending the non-voice service. For example, the operations include but are not limited to setting each suspended non-voice service flow to a suspended state, sending a suspension notification to a user plane function network element, triggering to release a user plane resource established by the first network for the terminal device, and sending a suspension notification to a policy and charging function network element. After receiving the suspension notification, the user plane function network element may buffer or discard a data packet of a suspended non-voice flow. After receiving the suspension notification, the policy charging function network element may perform corresponding traffic statistics collection, or send a suspension notification to a service server of a corresponding non-voice service such that the service server can pause sending of a data packet of a downlink non-voice service.

In an optional embodiment, before the session management network element in the first network suspends the non-voice service of the first network of the terminal device and/or the non-voice service of the third network of the terminal device, the session management network element in the first network determines whether the handover of the non-voice service of the terminal device from the first network to the second network is supported, suspends the non-voice service of the first network of the terminal device and/or the non-voice service of the third network of the terminal device if the handover of the non-voice service of the terminal device from the first network to the second network is not supported, and skips suspending the non-voice service of the first network of the terminal device and/or the non-voice service of the third network of the terminal device if the handover of the non-voice service of the terminal device from the first network to the second network is supported. For a specific meaning of supporting the handover, refer to related descriptions in 403. Details are not described herein again.

In another optional embodiment, before the session management network element in the first network suspends the non-voice service of the first network of the terminal device and/or the non-voice service of the third network of the terminal device, the session management network element in the first network determines whether returning of the terminal device from the second network to the first network is supported, and suspends the non-voice service of the first network of the terminal device and/or the non-voice service of the third network of the terminal device if the returning of the terminal device from the second network to the first network is supported. For a specific meaning of supporting the returning, refer to related descriptions in 403. Details are not described herein again.

It should be noted that one or more cases of 407 may occur together. For example, the session management network element in the first network receives the fourth information. With reference to the second case and the third case, the session management network element in the first network suspends the non-voice service of the terminal device, and deletes SM context information of a voice service of the terminal device.

In an optional embodiment, when performing the voice service handover of the terminal device, the mobile switching network element in the second network further needs to use security context information corresponding to the second network of the terminal device. Therefore, the mobility management network element in the first network may obtain the security context information of the first network of the terminal device, and obtain the security context information of the third network of the terminal device based on the security context information of the first network. The mobility management network element in the first network sends the security context information of the third network to the mobility management network element in the third network, for example, carries the security context information of the third network in a relocation request message. The mobility management network element in the third network obtains security context information of the second network of the terminal device based on the security context information of the third security network, and sends the security context information of the second network to the mobile switching network element in the second network. Therefore, before performing the voice service handover, the mobile switching network element in the second network performs a procedure related to security authentication and authorization on the terminal device based on the received security context information of the second network. In another possible design, the mobility management network element in the first network may further obtain security context information of the first network of the terminal device, and obtain security context information of the second network of the terminal device based on the security context information of the first network. The mobility management network element in the first network sends the security context information of the second network to the mobility management network element in the third network, for example, carries the security context information of the second network in a relocation request message. The mobility management network element in the third network forwards the security context information of the second network to the mobile switching network element in the second network. Therefore, before performing the voice service handover, the mobile switching network element in the second network performs a procedure related to security authentication and authorization on the terminal device based on the received security context information of the second network. For example, in the wireless communications system shown in FIG. 1, after receiving the handover request message, the AMF network element obtains security context information of the 5G network of the terminal device that is stored by the AMF network element, and derives security context information of the 4G network of the terminal device based on the security context information of the 5G network, adds the security context information of the 4G network to a relocation request message, and sends the relocation request message to the MME network element, the MME network element derives the security context information of the 2G/3G network of the terminal device based on the security context information of the 4G network of the terminal device, adds the security context information of the 2G/3G network of the terminal device to a packet-switched to circuit-switched request, and sends the request to the MSC network element, the MSC network element performs a process related to security authentication and authorization on the UE according to the security context information of the 2G/3G network of the UE. For another example, the AMF network element derives the security context information of the 2G/3G network of the terminal device based on the security context information of the 5G network, adds the security context information of the 2G/3G network to the relocation request message, and sends the relocation request message to the MME network element, the MME network element does not need to derive the security context information, instead, the security context information of the 2G/3G network is carried in the packet-switched to circuit-switched request and sent to the MSC network element.

In an optional embodiment, before sending, by an access network device in a first network, first information to a mobility management network element in the first network, the method further includes determining, by the access network device, whether there is feasibility for handing over the voice service of the terminal device from the first network to the second network, and if yes, sending the first information to the mobility management network element in the first network, or if no, skipping sending the first information to the mobility management network element in the first network.

In a possible design, the access network device in the first network may determine, based on whether the handover feasibility indication information is obtained, whether feasibility of handing over the voice service of the terminal device from the first network to the second network exists, where the handover feasibility indication information is used to indicate that handover of the voice service of the terminal device from the first network to the second network is feasible. The access network device in the first network may determine the feasibility according to whether the handover feasibility indication information is obtained from the mobility management network element in the first network. Alternatively, the handover feasibility indication information is stored on the access network device in the first network when handover feasibility indication information is obtained from the mobility management network element in the first network, and the feasibility may be determined based on whether the handover feasibility indication information is obtained locally from the access network device in the first network.

The following describes a manner of obtaining the handover feasibility indication information.

The first capability information includes capability information of handing over the terminal device from the first network to the second network in a voice service execution process, may include capability information indicating whether the terminal device supports a handover from the first network to the second network in a voice service execution process and/or information indicating whether the terminal device subscribes to a service that is handed over from the first network to the second network in a voice service execution process, for example, SRVCC capability information of the terminal device, whether the subscription information includes information about the C-MSISDN and the STN-SR. The second capability information includes capability information of handing over, by the access network device in the first network, the terminal device from the first network to the second network, and includes capability information of handing over, by the access network device in the first network, the terminal device from the first network to the second network in a voice service execution process, for example, SRVCC capability information of the NG RAN device. The third capability information includes capability information indicating that the core network device in the first network switches the terminal device from the first network to the second network, and includes capability information indicating that the core network device in the first network switches the terminal device from the first network to the second network in a voice service execution process, for example, SRVCC capability information of the AMF network element and the SMF network element and information about whether there is an interoperation interface between the first network and the second network or the third network. The terminal device sends a non-access stratum (NAS) message, for example, a service request message or a registration request message, to the mobility management network element in the first network. The NAS message may carry the first capability information, and the NAS message may be transparently transmitted by the access network device in the first network to the mobility management network element in the first network. When the access network device in the first network transparently transmits the NAS message or sends another message, the first capability information and/or the second capability information obtained from the air interface may also be sent to the mobility management network element in the first network. The mobility management network element in the first network may obtain the third capability information from another network element according to a configuration of the mobility management network element.

The following provides descriptions using a specific example.

The mobility management network element in the first network determines, based on at least one of the first capability information, the second capability information, and the third capability information, whether feasibility of handing over the voice service of the terminal device from the first network to the second network exists, and generates handover feasibility indication information if the feasibility of handing over the voice service of the terminal device from the first network to the second network exists, and may send the handover feasibility indication information to the first network access network device.

The terminal device sends an air interface message to the NG RAN device, where the air interface message carries a service request message, the service request message is used to change the terminal device from an idle state (CM-IDLE) to a connected state (CM-CONNECTED), and the service request message may carry SRVCC capability information of the terminal device. The NG RAN device obtains the service request message from the air interface message, and sends an N2 interface message to the AMF network element. The N2 interface message carries the service request message. The NG RAN device does not parse message content of the service request message. The N2 interface message sent by the NG RAN device to the AMF network element may further carry an SRVCC capability of the terminal device and/or an SRVCC capability of the NG RAN device that are/is obtained by the NG RAN device from an air interface. The AMF network element receives the service request message, and determines whether a feasibility condition is met. The feasibility condition includes one or more of the following conditions an SRVCC capability of a terminal device, subscription information of the terminal device, an SRVCC capability of an NG RAN device, and feasibility of whether an SRVCC capability of a core network device of a 5G network allows a 5G SRVCC operation, where the 5G SRVCC operation is to hand over a voice service of the 5G network of the terminal device to a voice service of a 2G/3G network. This operation may be triggered due to a network coverage condition, that is, a cell in which a terminal device enters has relatively weak 5G network signal coverage and is relatively strong 2G/3G network signal coverage, or may be triggered due to another condition. This is not limited in this embodiment of this application.

The SRVCC capability information of the terminal device is capability information that the terminal device supports handover from a 5G network to a 2G/3G network using an SRVCC procedure. Optionally, the SRVCC capability information of the terminal device includes altering SRVCC (aSRVCC) and/or before alerting SRVCC (bSRVCC) capability information of the terminal device, that is, the terminal device supports a capability of a handover from the 5G network to the 2G/3G network using an altering SRVCC procedure and/or a before alerting SRVCC procedure. The AMF network element may obtain the capability information from an N2 interface message, a registration request message, or another message using the terminal device. The subscription information of the terminal device includes information about whether the terminal device supports the SRVCC service, that is, information indicating that the terminal device subscribes to the SRVCC service from an operator. Optionally, the SRVCC service to which the terminal device subscribes includes an altering SRVCC service and/or a before alerting SRVCC service. The AMF network element may learn, based on the subscription information of the terminal device obtained from the UDM network element, whether the terminal device subscribes to the SRVCC service. For example, the AMF network element may obtain the subscription data of the terminal device from the UDM network element in a process in which the terminal device is registered with the 5G network.

The SRVCC capability of the NG-RAN device is capability information that the NG-RAN device supports the handover from the 5G network to the 2G/3G network using an SRVCC procedure. Optionally, the SRVCC capability information of the NG-RAN device includes altering SRVCC and/or before altering SRVCC capability information of the NG-RAN device. The AMF network element may obtain the SRVCC capability information of the NG-RAN device using a message such as an N2 interface message reported by the NG-RAN device. The SRVCC capability information of the core network device in the 5G network is capability information indicating whether the AMF network element, and/or the SMF network element, or the like support/supports a handover from the 5G network to the 2G/3G network using an SRVCC procedure, and may include altering SRVCC and/or before altering SRVCC capability information of the AMF network element and/or the SMF network element. The SRVCC capability of the core network device in the 5G network may further include information indicating whether an interoperation interface exists between the AMF network element and the MSC network element or the MME network element. The AMF network element may obtain the foregoing condition using operator configuration information. For example, information indicating whether the AMF network element, the SMF network element, and the like support the SRVCC capability is directly configured in operator configuration information of the AMF. The AMF may further learn, by sending an SRVCC capability obtaining request to another network element, whether the other network element supports the SRVCC capability. For example, the AMF network element sends a query message to the SMF network element, to learn whether the SMF network element supports the SRVCC capability.

If determining, based on the feasibility condition, that there is feasibility of handing over the voice service of the terminal device from the 5G network to the 2G/3G network, the AMF network element generates handover feasibility indication information, for example, feasibility indication information whose value is 1, and may send the handover feasibility indication information to the NG RAN device using an N2 interface message. If determining, based on the feasibility condition, that there is no feasibility of handing over the voice service of the terminal device from the 5G network to the 2G/3G network, the AMF network element generates handover infeasibility indication information, for example, infeasibility indication information whose value is 0, and may send the handover infeasibility indication information to the NG RAN device using an N2 interface message. For example, when a service request procedure initiated by the terminal device ends, the AMF network element sends an N2 interface message to the NG RAN device, and adds a service acceptance or service rejection message to the N2 interface message. The AMF network element may add both handover feasibility indication information or handover infeasibility indication information to the N2 interface message.

In this embodiment of this application, the terminal device may alternatively be returned from the second network to the first network after the voice service of the terminal device ends. Details of a returning process of the terminal device are described below.

As shown in FIG. 5, the returning process of the terminal device includes the following steps.

501. A mobility management network element in a third network sends network identifier information to a mobile switching network element in a second network, where the network identifier information is used to indicate that a terminal device is from a first network, and may be, for example, a last 5G PLMN ID. The network identifier information may be carried in a handover request.

The mobility management network element in the third network may obtain the network identifier information in a plurality of manners. For example, the mobility management network element in the third network determines an identifier of a mobility management network element in the first network based on a receive port of second information, and obtains the network identifier information based on the identifier of the mobility management network element in the first network. For another example, the mobility management network element in the first network sends the network identifier information to the mobility management network element in the third network.

For example, the MME network element determines an identifier of an AMF network element based on a receive port of a relocation request message, determines a last 5G PLMN ID based on the identifier of the AMF network element, adds the last 5G PLMN ID to a packet-switched to circuit-switched request, and sends the packet-switched to circuit-switched request to an MSC network element.

502. The mobile switching network element in the second network triggers, based on the network identifier information, a base station controller in the second network to return the terminal device from the second network to the first network.

The triggering a base station controller in the second network to return the terminal device from the second network to the first network may be triggering the base station controller in the second network to return the terminal device from the second network to the first network when releasing a radio resource of the terminal device. The mobile switching network element in the second network may trigger, by sending the network identifier information to the base station controller in the second network, the base station controller in the second network to return the terminal device from the second network to the first network. The network identifier information may be sent to the base station controller in the second network when a handover request message, a radio resource establishment message, or a radio resource release message is sent to the base station controller in the second network. Details are described below. For example, in a voice service handover preparation phase, the MSC network element may add the last 5G PLMN ID to a handover request message sent to an RNC/BSC network element. For another example, when the terminal device accesses a target 2G/3G cell and establishes a Radio Resource Control (RRC) connection and an Iu/B interface connection, the MSC network element sends the last 5G PLMN ID to the RNC/BSC network element using an Iu/B interface. For another example, when the RRC connection and the Iu/B interface connection are released, the MSC network element sends the last 5G PLMN ID to the RNC/BSC network element.

503. The base station controller in the second network returns the terminal device to the first network based on the network identifier information. Further, the base station controller in the second network returns the terminal device from the second network to the first network when releasing a radio resource of the terminal device. For example, after the RNC/BSC network element determines that a voice service of the terminal device ends, or after the MSC network element notifies the RNC/BSC network element that a voice service of the terminal device ends, an RRC connection release message that is sent by the RNC/BSC network element to the terminal device based on the last 5G PLMN ID sent by the MSC network element carries redirection information, and the redirection information is used to instruct the terminal device to access or preferably access a network corresponding to the last 5G PLMN ID.

Before performing 502, the mobile switching network element in the second network may further determine whether returning of the terminal device from the second network to the first network is supported, and further determine whether returning of the terminal device from the second network to the first network is supported after the voice service of the terminal device in the second network ends, and perform 502 if the returning is supported, or skip an operation of triggering the returning if the returning is not supported. Whether returning of the terminal device from the second network to the first network is supported may mean whether at least one or more of the terminal device, a device in the first network, a device in the second network, and a device in the third network support the returning of the terminal device from the second network to the first network. For example, the mobile switching network element in the second network determines whether the terminal device, the AMF network element, the MME network element, the MSC network element, and the RNC/BSC network element cooperate with each other, to support returning the terminal device from the second network to the first network.

Figure 6:
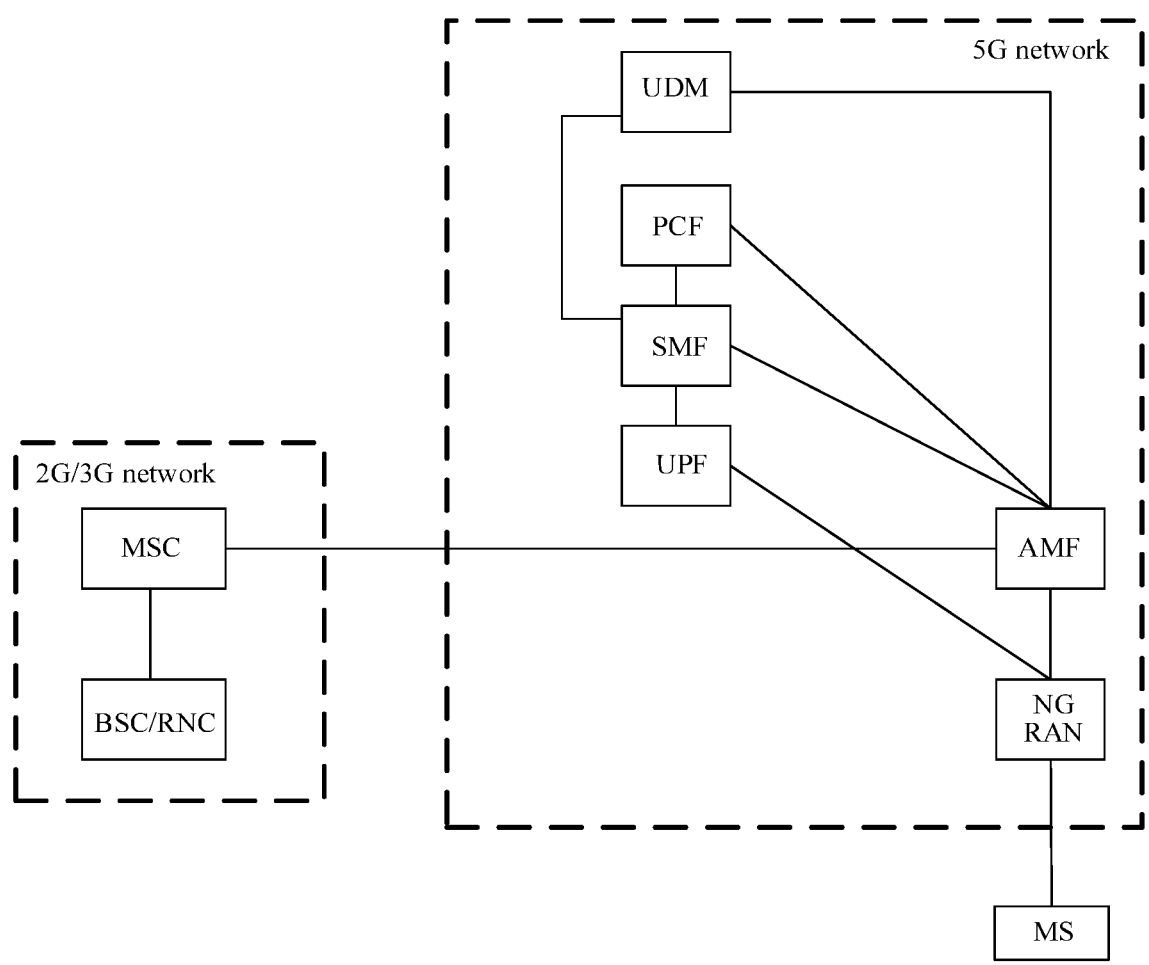
FIG. 6 is a schematic structural diagram of another communication system.

In this embodiment of this application, before performing the handover of the voice service, the mobility management network element in the first network may first determine whether an interoperation interface exists between the mobility management network element in the first network and the mobility management network element in the third network, and perform the handover of the voice service if the interoperation interface exists. Actually, in the foregoing embodiment of this application, communication between the first network and the third network and communication between the second network and the third network enable the voice service of the terminal device to be handed over from the first network to the second network. Actually, in this embodiment of this application, a network handover may alternatively be implemented using an interoperation interface between the first network and the second network. For example, as shown in FIG. 6, the first network may be a 5G network, the second network may be a 2G/3G network, and an interoperation interface exists between the AMF network element and the MSC network element. Therefore, before performing the handover of the voice service, the mobility management network element in the first network may determine whether an interoperation interface exists between the mobility management network element in the first network and the mobility management network element in the third network and the mobile switching network element in the second network. If an interoperation interface exists between the mobility management network element in the first network and the mobility management network element in the third network, the network handover of the voice service may be implemented according to the method embodiment corresponding to FIG. 2. If an interoperation interface exists between the mobility management network element in the first network and the mobile switching network element in the second network, the network handover of the voice service may be implemented according to the method embodiment corresponding to FIG. 7. Details of the method embodiment corresponding to FIG. 7 are described below.

Figure 7:
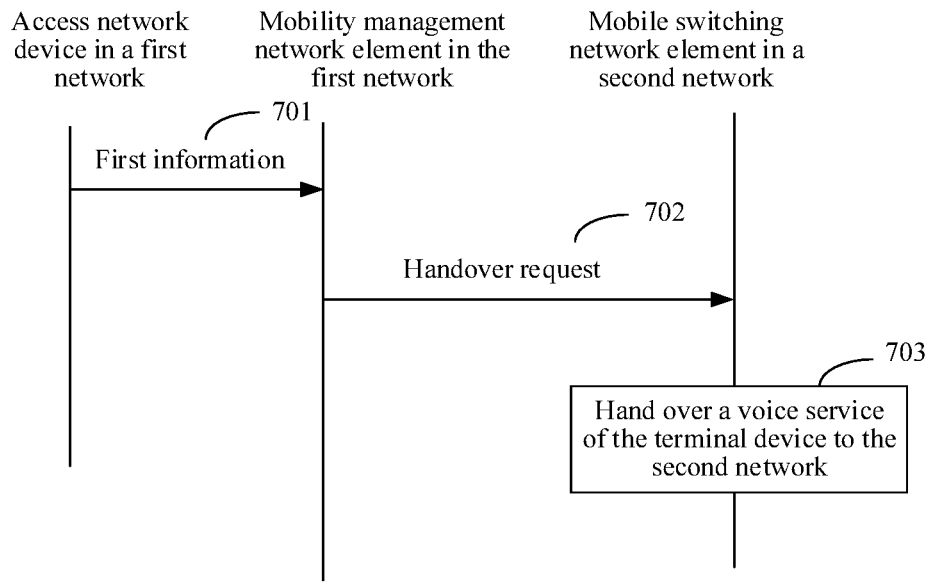
FIG. 7 is a schematic flowchart of an embodiment of another network handover method of a voice service according to this application.

Referring to FIG. 7, an embodiment of this application provides another method embodiment of a network handover method of a voice service. This embodiment may be applied to the wireless communications system shown in FIG. 6.

This embodiment includes the following steps.

701. An access network device in a first network sends first information to a mobility management network element in the first network, and correspondingly, the mobility management network element in the first network receives the first information from the access network device in the first network, where the first information is used to indicate a handover of user equipment from the first network to a second network.

For details of related content of 701, refer to 201 in the embodiment corresponding to FIG. 2. Details are not described herein again.

702. The mobility management network element in the first network receives the first information from the access network device in the first network, and the mobility management network element in the first network sends a handover request to a mobile switching network element in the second network based on the first information, correspondingly, the mobile switching network element in the second network receives the handover request, where the handover request is used to hand over a voice service of the terminal device to the second network.

In this embodiment of this application, after receiving the first information, the mobility management network element in the first network may send the handover request to the mobile switching network element in the second network using an interoperation interface between the mobility management network element in the first network and the mobile switching network element in the second network. As an example, in the wireless communications system shown in FIG. 6, the mobile switching network element in the second network may be an MSC network element. An AMF network element receives a handover request message, and sends a packet-switched to a circuit-switched request to the MSC network element based on an SRVCC handover indication and/or a target identifier of a 2G/3G network that are/is carried in the handover request message, and the packet-switched to circuit-switched request is used to instruct the MSC network element to hand over the voice service of the terminal device to the 2G/3G network.

After receiving the first information, the mobility management network element in the first network may further obtain security context information of the second network, and send the security context information of the second network to the mobile switching network element in the second network, for example, may add the security context information of the second network in the handover request such that the mobile switching network element in the second network hands over the voice service of the terminal device to the second network based on the security context information of the second network.

The mobility management network element in the first network may obtain the security context information of the second network in two manners. In one manner, the mobility management network element in the first network may first obtain the security context information of the third network based on the security context information of the first network, and then obtain the security context information of the second network based on the security context information of the third network. For example, the AMF derives security context information of the 4G network based on security context information of the 5G network that is stored by the AMF, and then derives security context information of the 2G/3G network based on the security context information of the 4G network. In the other manner, the mobility management network element in the first network may directly generate a security context of the second network based on a security context of the first network without using a security context of the third network. For example, the AMF directly derives the security context information of the 2G/3G network based on security context information the 5G network that is stored by the AMF.

703. The mobile switching network element in the second network receives the handover request and hands over the voice service of the terminal device to the second network based on the handover request.

For a handover process of handing over the voice service of the terminal device to the second network, refer to related descriptions of 204. Details are not described herein again.

After completing the handover of the voice service, the mobile switching network element in the second network may send handover completion information to the mobility management network element in the first network. The handover completion information is used to indicate that the handover is completed and may carry an identifier of a voice handover from the first network to the second network, for example, an SRVCC handover indication.

After the handover of the voice service is completed, the terminal device may be further registered with the 2G/3G network by sending a registration request. Further, after determining that the handover of the voice service is completed, the terminal device may send a route area update request and/or an attachment request to an SGSN network element.

In this embodiment, communication between the first network and the second network enables the voice service of the terminal device to be directly handed over from the first network to the second network, and the voice service of the terminal device does not need to be first handed over to a third network. Therefore, a problem that the terminal device in the first network cannot implement the voice service is resolved.

In an optional embodiment, when performing a handover, the mobile switching network element in the second network also needs to use information about the terminal device. Therefore, the mobility management network element in the first network may obtain the information, and send the information to the mobile switching network element in the second network. Therefore, the mobile switching network element in the second network performs the handover of the voice service based on the information. The information about the terminal device may include one or more of the following information: a classmark of the terminal device, information about a codec supported by the terminal device, and subscription information used to hand over the voice service of the terminal device to the second network. The classmark of the terminal device may further include a classmark 2 and/or a classmark 3 of the terminal device. The information about the codec supported by the terminal device may be information about a codec of a CS voice service supported by the terminal device. The subscription information may include a C-MSISDN and/or an STN-SR. The information may be obtained by the mobility management network element in the first network. For example, the mobility management network element in the first network may obtain the information about the terminal device from a unified data management function network element or a subscription data register (for example, a UDM/HSS) in the first network. The subscription data register in the first network stores original subscription information (including the C-MSISDN and/or the STN-SR) of the terminal device, and may send the original subscription information to the mobility management network element in the first network in a process in which the terminal device is registered with the first network. The mobility management network element in the first network stores the subscription information. When the terminal device performs a registration procedure with an IMS network, an application server (for example, an SCC AS) in the IMS network obtains an updated STN-SR. The updated STN-SR may be generated by the application server or generated by an access transfer control function network element and sent to the application server. The application server sends the updated STN-SR to the subscription data register in the first network, and the subscription data register in the first network determines whether the updated STN-SR is the same as the STN-SR in the originally stored subscription information, and sends the updated STN-SR to the mobility management network element in the first network if the updated STN-SR is different from the STN-SR in the originally stored subscription information. The mobility management network element in the first network replaces the originally stored STN-SR with the updated STN-SR, and uses the updated STN-SR as a part of subscription data.

A difference between this embodiment and the embodiments corresponding to FIG. 2 to FIG. 5 lies in that the network handover is implemented through direct communication between the first network and the second network. Similar to the embodiment corresponding to FIG. 3, in this embodiment, the SM context information in the second network of the terminal device may also be obtained from the session management network element in the first network. A difference lies in that the obtained SM context information is sent to the mobile switching network element in the second network. A manner of obtaining the SM context information and a manner of sending the SM context information are similar to those in the embodiment corresponding to FIG. 3. For details, refer to the descriptions in the foregoing embodiment. Details are not described herein again. Similar to the embodiment corresponding to FIG. 4, in this embodiment, the SM context information in the SMF network element may also be deleted or suspended based on the third information or the fourth information. Manners of deleting and suspending the SM context information are similar to those in the embodiment corresponding to FIG. 4. For details, refer to the descriptions in the foregoing embodiment. Details are not described herein again. Similar to the embodiment corresponding to FIG. 5, in this embodiment, the terminal device may also be returned from the second network to the first network, and a difference lies in that the mobility management network element in the first network obtains the network identifier information, and directly sends the network identifier information to the mobile switching network element in the second network. Other content is similar to that in the embodiment corresponding to FIG. 5. For details, refer to the descriptions in the foregoing embodiment. Details are not described herein again. In addition, before sending the first information to the mobility management network element in the first network, the access network device in the first network may further determine whether there is feasibility of handing over the voice service of the terminal device from the first network to the second network. The feasibility determining manner is similar to related content in the foregoing embodiment, and a difference lies in that the feasibility is feasibility of handing over the voice service of the terminal device from the first network to the second network without through the third network. For details, refer to the descriptions in the foregoing embodiment. Details are not described herein again.

Method embodiments in the embodiments of the present disclosure are described above, and the following describes apparatus embodiments in the embodiments of the present disclosure from the perspective of modularized function entities.

Figure 8:
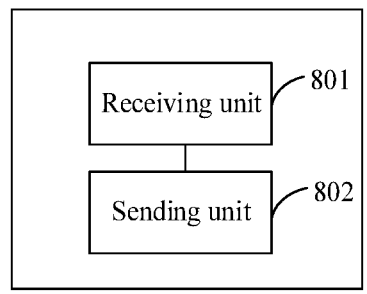
FIG. 8 is a schematic structural diagram of an embodiment of a network handover apparatus of a voice service according to this application.

Referring to FIG. 8, this application provides a network handover apparatus of a voice service. The apparatus includes a receiving unit 801 and a sending unit 802. The apparatus in this embodiment may be used in a mobility management network element in a first network.

The receiving unit 801 is configured to receive first information from an access network device in the first network, where the first information is used to indicate a handover of a terminal device from the first network to a second network.

The sending unit 802 is configured to send second information to a mobility management network element in a third network based on the first information, where the second information is used to instruct the mobility management network element in the third network to send a handover request to a mobile switching network element in the second network, and the handover request is used to hand over a voice service of the terminal device to the second network.

It can be learned that communication between the first network and the third network and communication between the third network and the second network enable the voice service of the terminal device to be handed over to the second network, implementing continuity of the voice service and resolving a problem that the terminal device cannot implement the voice service in the first network.

Optionally, the first information is used to indicate a handover of the voice service of the terminal device from the first network to the second network. In this embodiment, the handover of the voice service of the terminal device from the first network to the second network is to maintain continuity of the voice service.

Optionally, the second network supports a circuit-switched voice service.

Optionally, the sending unit 802 is further configured to send information about the terminal device to the mobility management network element in the third network, where the information about the terminal device includes one or more of the following information: a classmark of the terminal device, information about a codec supported by the terminal device, and subscription information used to hand over the voice service of the terminal device to the second network.

Optionally, the first information includes a first identifier of a voice handover from the first network to the second network and/or a target identifier of the second network, and the second information includes a second identifier of a voice handover from the first network to the second network and/or the target identifier of the second network.

Optionally, the receiving unit 801 is further configured to receive session information of the third network of the terminal device from a session management network element in the first network, where the session information of the third network includes session management context information of a voice service of the third network or session management context information of a non-voice service of the third network, and the sending unit 802 is further configured to send the session information of the third network of the terminal device to the mobility management network element in the third network.

Optionally, the sending unit 802 is further configured to send third information to the session management network element in the first network, where the third information is used to indicate a handover of the terminal device from the first network to the second network, and the third information includes a third identifier of a voice handover from the first network to the second network and/or the target identifier of the second network.

Optionally, the apparatus further includes a first determining unit configured to determine that a handover of a non-voice service of the terminal device from the first network to the second network is supported.

Optionally, the apparatus further includes a second determining unit configured to send, using the sending unit, a session deletion request to the session management network element in the first network after determining that the handover of the terminal device from the first network to the second network is completed, where the session deletion request is used to request the session management network element in the first network to delete session management context information of the first network of the terminal device and/or session management context information of the third network of the terminal device, and the session management context information of the third network is generated based on the session management context information of the first network.

Optionally, the sending unit 802 is further configured to send cause information to the session management network element in the first network, where the cause information is used to indicate a reason why the session management context information of the first network of the terminal device and/or the session management context information of the third network of the terminal device are/is deleted.

Optionally, the cause information includes information indicating that the handover of the voice service of the terminal device from the first network to the second network is completed.

Optionally, the sending unit 802 is further configured to send fourth information to the session management network element in the first network, where the fourth information is used to indicate that the handover of the terminal device from the first network to the second network is completed.

Optionally, the apparatus further includes a third determining unit configured to determine that an interoperation interface exists between the mobility management network element in the first network and the mobility management network element in the third network.

Optionally, the apparatus further includes a skipping unit configured to skip, based on the first information, an operation of obtaining the session management context information of the third network of the terminal device from the session management network element in the first network.

Optionally, the apparatus further includes a fourth determining unit configured to determine that a handover of a non-voice service of the terminal device from the first network to the second network is not supported.

Optionally, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

Figure 9:
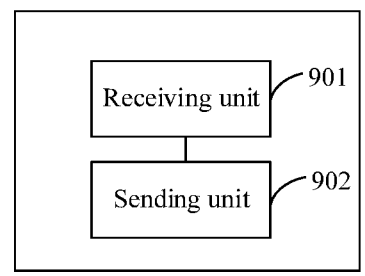
FIG. 9 is a schematic structural diagram of an embodiment of a network handover apparatus of a voice service according to this application.

Referring to FIG. 9, this application provides a network handover apparatus of a voice service. The apparatus includes a receiving unit 901 and a sending unit 902. The apparatus in this embodiment may be used in a mobility management network element in a third network.

The receiving unit 901 is configured to receive second information from a mobility management network element in a first network, where the second information is used to indicate a handover of a terminal device from the first network to a second network.

The sending unit 902 is configured to send a handover request to a mobile switching network element in the second network based on the second information, where the handover request is used to hand over a voice service of the terminal device to the second network.

Optionally, the receiving unit 901 is further configured to receive information about the terminal device from the mobility management network element in the first network, where the information about the terminal device includes one or more of the following information: a classmark of the terminal device, information about a codec supported by the terminal device, and subscription information used to hand over the voice service of the terminal device to the second network, and the sending unit 902 is further configured to send the information about the terminal device.

Optionally, the sending unit 902 is further configured to send network identifier information to the mobile switching network element in the second network, where the network identifier information is used to indicate that the terminal device is from the first network.

Optionally, the apparatus further includes a determining unit configured to determine that returning of the terminal device from the second network to the first network is supported.

Optionally, the second information includes an identifier of a voice handover from the first network to the second network and/or a target identifier of the second network.

Optionally, the apparatus further includes a triggering unit, and the receiving unit 901 is further configured to receive session management context information of a non-voice service of the third network of the terminal device from the mobility management network element in the first network, and the triggering unit is configured to trigger a handover of a non-voice service of the terminal device to the second network based on the session management context information of the non-voice service of the third network of the terminal device.

In the design, when the voice service of the terminal device is handed over to the second network, the non-voice service of the terminal device can also be handed over to the second network. Therefore, when the first network cannot provide a service for the terminal device, the second network continues to serve the terminal device, improving user experience.

Figure 10:
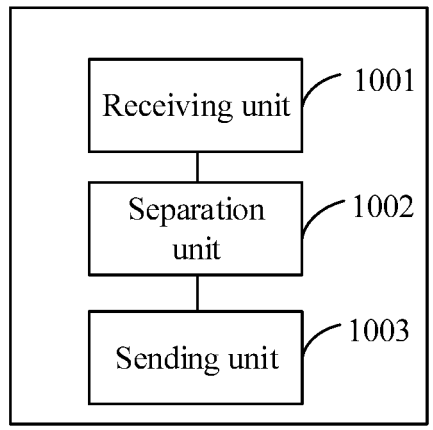
FIG. 10 is a schematic structural diagram of an embodiment of an information obtaining apparatus according to this application.

Referring to FIG. 10, this application provides an information obtaining apparatus. The apparatus includes a receiving unit 1001, a separation unit 1002, and a sending unit 1003. The apparatus in this embodiment may be used in a session management network element in a first network.

The receiving unit 1001 is configured to receive third information from a mobility management network element in the first network, where the third information is used to indicate a handover of a terminal device from the first network to a second network.

The separation unit 1002 is configured to perform a separation operation on session management context information of a third network of the terminal device based on the third information, to obtain separated session management context information, where the separated session management context information includes session management context information of a non-voice service of the third network of the terminal device and/or session management context information of a voice service of the third network of the terminal device that is obtained after separation.

The sending unit 1003 is configured to send the separated session management context information to the mobility management network element in the first network.

Optionally, the third information is used to indicate a handover of the voice service of the terminal device from the first network to the second network.

Optionally, the apparatus further includes a first determining unit configured to determine that a handover of a non-voice service of the terminal device from the first network to the second network is supported.

Optionally, the handover of a non-voice service of the terminal device from the first network to the second network is supported includes at least one or more of the terminal device, a device in the first network, a device in the second network, and a device in the third network support the handover of the non-voice service of the terminal device from the first network to the second network.

Optionally, the apparatus further includes a suspension unit configured to suspend the session management context information of the non-voice service of the third network of the terminal device.

Optionally, the apparatus further includes a second determining unit configured to determine that a handover of a non-voice service of the terminal device from the first network to the second network is not supported, or determine that returning of the terminal device from the second network to the first network is supported.

Optionally, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

Optionally, returning of the terminal device from the second network to the first network is supported includes at least one or more of the terminal device, a device in the first network, a device in the second network, and a device in the third network support returning of the terminal device from the second network to the first network.

Figure 11:
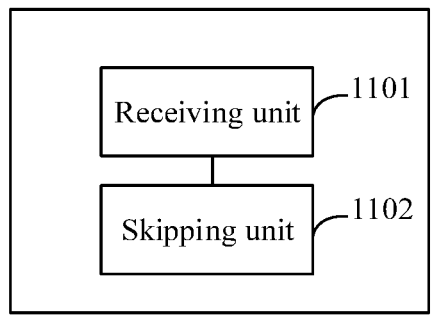
FIG. 11 is a schematic structural diagram of an embodiment of an information processing apparatus according to this application.

Referring to FIG. 11, this application provides an information processing apparatus. The apparatus includes a receiving unit 1101 and a skipping unit 1102. The apparatus in this embodiment may be used in a session management network element in a first network.

The receiving unit 1101 is configured to receive third information from a mobility management network element in the first network, where the third information is used to indicate a handover of a terminal device from the first network to a second network.

The skipping unit 1102 is configured to skip, based on the third information, an operation of sending session management context information of a third network of the terminal device to the mobility management network element in the first network.

Optionally, the third information is used to indicate a handover of a voice service of the terminal device from the first network to the second network.

Optionally, the apparatus further includes a determining unit configured to determine that a handover of a non-voice service of the terminal device from the first network to the second network is not supported.

Optionally, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

Figure 12:
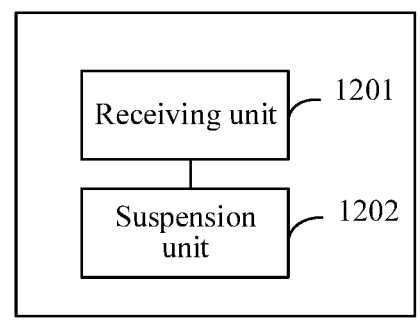
FIG. 12 is a schematic structural diagram of an embodiment of an information suspension apparatus according to this application.

Referring to FIG. 12, this application provides an information suspension apparatus. The apparatus includes a receiving unit 1201 and a suspension unit 1202. The apparatus in this embodiment may be used in a session management network element in a first network.

The receiving unit 1201 is configured to receive third information from a mobility management network element in the first network, where the third information is used to indicate a handover of a terminal device from the first network to a second network.

The suspension unit 1202 is configured to suspend session management context information of a non-voice service of the first network of the terminal device and/or session management context information of a non-voice service of a third network of the terminal device based on the third information.

Optionally, the third information is used to indicate a handover of a voice service of the terminal device from the first network to the second network.

Optionally, the apparatus further includes a determining unit configured to determine that a handover of a non-voice service of the terminal device from the first network to the second network is not supported, or determine that returning of the terminal device from the second network to the first network is supported.

Optionally, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

Optionally, returning of the terminal device from the second network to the first network is supported includes at least one or more of the terminal device, a device in the first network, a device in the second network, and a device in the third network support returning of the terminal device from the second network to the first network.

Figure 13:
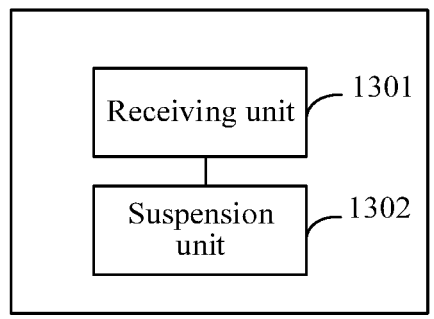
FIG. 13 is a schematic structural diagram of an embodiment of an information suspension apparatus according to this application.

Referring to FIG. 13, this application provides an information suspension apparatus. The apparatus includes a receiving unit 1301 and a suspension unit 1302. The apparatus in this embodiment may be used in a session management network element in a first network.

The receiving unit 1301 is configured to receive fourth information from a mobility management network element in a first network, where the fourth information is used to indicate that a handover of a terminal device from the first network to a second network is completed.

The suspension unit 1302 is configured to suspend session management context information of a non-voice service of the first network of the terminal device and/or session management context information of a non-voice service of a third network of the terminal device based on the fourth information.

Optionally, the fourth information is used to indicate that a handover of a voice service of the terminal device from the first network to the second network is completed.

Optionally, the apparatus further includes a determining unit configured to determine that a handover of a non-voice service of the terminal device from the first network to the second network is not supported, or determine that returning of the terminal device from the second network to the first network is supported.

Optionally, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

Optionally, returning of the terminal device from the second network to the first network is supported includes at least one or more of the terminal device, a device in the first network, a device in the second network, and a device in the third network support returning of the terminal device from the second network to the first network.

Figure 14:
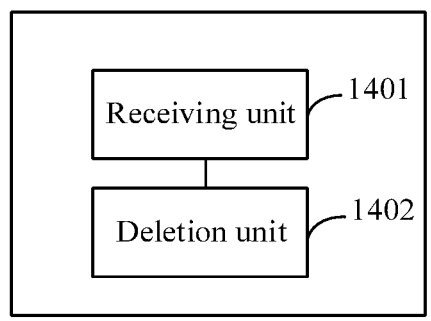
FIG. 14 is a schematic structural diagram of an embodiment of an information deletion apparatus according to this application.

Referring to FIG. 14, this application provides an information deletion apparatus. The apparatus includes a receiving unit 1401 and a deletion unit 1402. The apparatus in this embodiment may be used in a session management network element in a first network.

The receiving unit 1401 is configured to receive fourth information from a mobility management network element in a first network, where the fourth information is used to indicate that a handover of a terminal device from the first network to a second network is completed.

The deletion unit 1402 is configured to delete session management context information of the first network of the terminal device and/or session management context information of a third network of the terminal device based on the fourth information.

Optionally, the fourth information is used to indicate that a handover of a voice service of the terminal device from the first network to the second network is completed.

Optionally, the deletion unit includes a first deletion unit and/or a second deletion unit, where the first deletion unit is configured to delete session management context information of a voice service of the first network of the terminal device and/or session management context information of a non-voice service of the first network of the terminal device, and the second deletion unit is configured to delete session management context information of a voice service of the third network of the terminal device and/or session management context information of a non-voice service of the third network of the terminal device.

Optionally, the apparatus further includes a determining unit configured to determine that a handover of a non-voice service of the terminal device from the first network to the second network is not supported, or determine to that returning of the terminal device from the second network to the first network is not supported.

Optionally, that the handover of a non-voice service of the terminal device from the first network to the second network is not supported includes at least one or more of the terminal device, a device in the first network, a device in the second network, and a device in the third network do not support the handover of the non-voice service of the terminal device from the first network to the second network.

Optionally, returning of the terminal device from the second network to the first network is supported includes at least one or more of the terminal device, a device in the first network, a device in the second network, and a device in the third network support returning of the terminal device from the second network to the first network.

Figure 15:
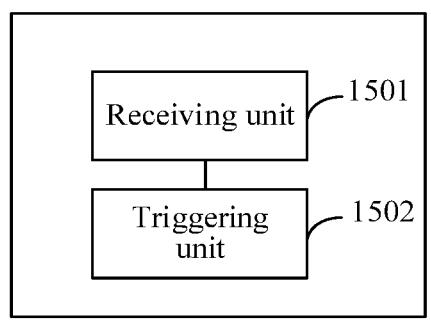
FIG. 15 is a schematic structural diagram of an embodiment of a network returning apparatus according to this application.

Referring to FIG. 15, this application provides a network returning apparatus. The apparatus includes a receiving unit 1501 and a triggering unit 1502. The apparatus in this embodiment may be used in a mobile switching network element in a second network.

The receiving unit 1501 is configured to receive network identifier information from a mobility management network element in a third network, where the network identifier information is used to indicate that a terminal device is from a first network.

The triggering unit 1502 is configured to trigger, based on the network identifier information, a base station controller in the second network to return the terminal device from the second network to the first network.

Optionally, the triggering unit 1502 is further configured to trigger, based on the network identifier information, the base station controller in the second network to return the terminal device from the second network to the first network when releasing a radio resource of the terminal device.

Optionally, the triggering unit 1502 includes a sending unit configured to send the network identifier information to the base station controller in the second network.

Optionally, the sending unit is further configured to send the network identifier information to the base station controller in the second network when sending a handover request message, a signaling connection establishment response, or a radio resource release request to the base station controller in the second network.

Optionally, the apparatus further includes a determining unit configured to determine that returning of the terminal device from the second network to the first network is supported.

Optionally, returning of the terminal device from the second network to the first network is supported includes at least one or more of the terminal device, a device in the first network, a device in the second network, and a device in the third network support returning of the terminal device from the second network to the first network.

The foregoing describes the apparatuses in the embodiments of the present disclosure from the perspective of a modular function entity. The following describes the network device in the embodiments of the present disclosure from a perspective of hardware processing.

Figure 16:
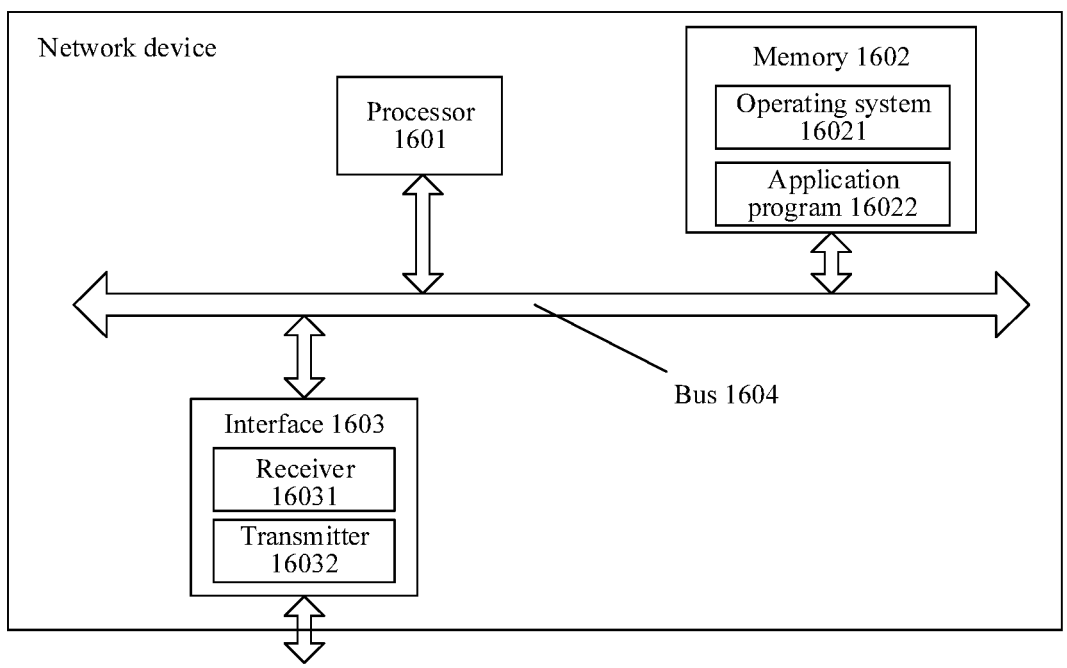
FIG. 16 is a schematic structural diagram of a network device according to this application.

Referring to FIG. 16, an embodiment of the present disclosure provides an apparatus embodiment of a network device. The network device in this embodiment includes a processor 1601, a memory 1602, an interface 1603, and a bus 1604, where the interface 1603 may be implemented in a wireless or wired manner, and further, may be an element such as a network interface card. The processor 1601, the memory 1602, and the interface 1603 are connected using the bus 1604. The interface 1603 further includes a receiver 16031 and a transmitter 16032.

The processor 1601 may be a central processing unit (CPU), an application-specific integrated circuit (ASIC), or one or more integrated circuits configured to implement this embodiment of this application.

In this embodiment, the memory 1602 includes an operating system 16021 and an application program 16022, and is configured to store a program, code, or an instruction. When executing the program, code, or instruction, the processor or a hardware device may complete the methods shown in FIG. 2 to FIG. 5. The memory 1602 may include a high-speed random-access memory (RAM), or may include a non-volatile memory, for example, at least one magnetic disk storage.

The network device may be an access network device in a first network, a mobility management network element in a first network, a session management network element in a first network, a mobility management network element in a third network, or a mobile switching network element in a second network.

For example, in an embodiment, the processor 1601 is configured to perform another operation or function of the access network device in any first network in FIG. 2 to FIG. 4 and FIG. 7. The receiver 16031 is configured to implement communication between the access network device in the first network and user equipment/the mobility management network element in the first network.

In another embodiment, the processor 1601 is configured to perform another operation or function of the mobility management network element in any first network in FIG. 2 to FIG. 4 and FIG. 7. The receiver 16031 is configured to implement communication between the mobility management network element in the first network and the access network device in the first network, the mobility management network element in the third network, or the mobile switching network element in the second network.

In another embodiment, the processor 1601 is configured to perform another operation or function of the session management network element in any first network in FIG. 2 to FIG. 4 and FIG. 7. The receiver 16031 is configured to implement communication between the session management network element in the first network and the mobility management network element in the first network.

In another embodiment, the processor 1601 is configured to perform another operation or function of the mobility management network element in any third network in FIG. 2 to FIG. 4 and FIG. 7. The receiver 16031 is configured to implement communication between the mobility management network element in the third network and the mobility management network element in the first network/the mobile switching network element in the second network.

In another embodiment, the processor 1601 is configured to perform another operation or function of the mobile switching network element in any second network in FIG. 2 to FIG. 4 and FIG. 7. The receiver 16031 is configured to implement communication between the mobile switching network element in the second network and the mobility management network element in the first network, the mobility management network element in the third network, and a base station controller in the second network.

An embodiment of this application further provides a computer-readable storage medium, including an instruction. When the instruction is run on a computer, the computer is enabled to perform the foregoing methods.

An embodiment of this application further provides a computer program product including an instruction. When the computer program product is run on a computer, the computer is enabled to perform the foregoing methods.

The embodiments provided in this application may be split into one or more embodiments without departing from a core idea of this application. The embodiments may be combined with each other and learned from each other. This is not limited in the embodiments of this application.

In the specification, claims, and accompanying drawings of the embodiments of this application, the terms "first", "second", "third", "fourth", and the like are intended to distinguish between similar objects, but do not indicate a specific order or sequence. It should be understood that the data used in such a way are interchangeable in proper circumstances so that the embodiments described herein can be implemented in other orders than the order illustrated or described herein. In addition, the terms "include", "have", and any other variants mean to cover non-exclusive inclusion, for example, a process, method, system, product, or device that includes a list of steps or units is not necessarily limited to those expressly listed steps or units, but may include other steps or units that are not expressly listed or inherent to such a process, method, product, or device.

All or some of the foregoing embodiments may be implemented using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or may be a data storage device such as a server or a data center integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, various modifications and combinations may be made to them without departing from the spirit and scope of this application. Correspondingly, the specification and accompanying drawings are merely examples for description of this application defined by the accompanying claims, and are considered as any or all of modifications, variations, combinations, or equivalents that cover the scope of this application. A person skilled in the art can make various modifications and variations to this application without departing from the spirit and scope of this application. This application is intended to cover these modifications and variations of this application provided that they fall within the scope of the following claims and their equivalent technologies.

What is claimed is:

1. A network handover method of a voice service of a terminal device,
   wherein the network handover method is implemented by a first mobility management network element in a first network, wherein the first mobility management network element is an access and mobility management function (AMF) network element, wherein the first network is a fifth-generation (5G) network, and wherein the network handover method comprises:
   receiving first information from an access network device in the first network, wherein the first information indicates a handover of the terminal device from the first network to a second network, wherein the handover is a single radio voice call continuity (SRVCC) handover, and wherein the second network is a second-generation (2G) network or a third-generation (3G) network;
   skipping, based on the first information, an operation of sending a session management context request to a session management network element in the first network, wherein the first information comprises at least one of a first identifier of a voice handover from the first network to the second network or a target identifier of the second network; and
   sending, based on the first information, second information to a second mobility management network element in a third network,
   wherein the second information instructs the second mobility management network element to send a handover request to a mobile switching network element in the second network,
   wherein the handover request is a packet-switched to circuit-switched request message,
   wherein the handover request requests handing over the voice service to the second network,
   wherein the second mobility management network element is a mobility management entity (MME) network element, wherein the third network is an Evolved Packet System (EPS) network, and wherein the mobile switching network element is a mobile switching center (MSC) network element.

2. The network handover method of claim 1, further comprising sending third information about the terminal device to the second mobility management network element, wherein the third information comprises subscription information for handing over the voice service to the second network.

3. The network handover method of claim 2, wherein the subscription information comprises a Correlation-Mobile Station Integrated Services Digital Network (C-MSISDN) and a session transfer number SRVCC (STN-SR).

4. The network handover method of claim 1, wherein the second information comprises at least one of a second identifier of the voice handover or the target identifier.

5. The network handover method of claim 4, wherein the first identifier is an SRVCC handover indication indicating the handover of the voice service from the first network to the second network.

6. The network handover method of claim 4, wherein the second identifier is an SRVCC handover indication indicating the handover of the voice service from the first network to the second network.

7. The network handover method of claim 4, wherein the target identifier comprises a target radio network controller (RNC) identifier.

8. The network handover method of claim 1, further comprising:
determining that the handover of the terminal device from the first network to the second network is completed; and
sending a session deletion request to the session management network element in the first network, wherein the session deletion request requests the session management network element to delete session management context information of the terminal device in the first network.

9. The network handover method of claim 1, further comprising determining that an interoperation interface exists between the first mobility management network element and the second mobility management network element.

10. A first mobility management network element in a first network for handing over a voice service of a terminal device, wherein the first mobility management network element is an access and mobility management function (AMF) network element, wherein the first network is a fifth-generation (5G) network, and wherein the first mobility management network element comprises:
a memory configured to store computer program instructions; and
a processor coupled to the memory and configured to execute the computer program instructions to cause the first mobility management network element to:
receive first information from an access network device in the first network, wherein the first information indicates a handover of the terminal device from the first network to a second network, wherein the handover is a single radio voice call continuity (SRVCC) handover, and wherein the second network is a second-generation (2G) network or a third-generation (3G) network;
skip, based on the first information, an operation of sending a session management context request to a session management network element in the first network, wherein the first information comprises at least one of a first identifier of a voice handover from the first network to the second network or a target identifier of the second network; and
send, based on the first information, second information to a second mobility management network element in a third network,
wherein the second information instructs the second mobility management network element to send a handover request to a mobile switching network element in the second network,
wherein the handover request is a packet-switched to circuit-switched request message,
wherein the handover request requests handing over the voice service to the second network,
wherein the second mobility management network element is a mobility management entity (MME) network element,
wherein the third network is an Evolved Packet System (EPS) network, and
wherein the mobile switching network element is a mobile switching center (MSC) network element.

11. The first mobility management network element of claim 10, wherein the computer program instructions further cause the first mobility management network element to send third information about the terminal device to the second mobility management network element, and wherein the third information comprises subscription information for handing over the voice service to the second network.

12. The first mobility management network element of claim 10, wherein the second information comprises at least one of a second identifier of the voice handover or the target identifier.

13. The first mobility management network element of claim 10, wherein the computer program instructions further cause the first mobility management network element to:
determine that the handover of the terminal device from the first network to the second network is completed; and
send a session deletion request to the session management network element in the first network, wherein the session deletion request requests the session management network element to delete session management context information of the terminal device in the first network.

14. The first mobility management network element of claim 10, wherein the computer program instructions further cause the processor to be configured to cause the first mobility management network element to determine that an interoperation interface exists between the first mobility management network element and the second mobility management network element.

15. A computer program product comprising computer-executable instructions that are stored on a non-transitory computer-readable medium and that, when executed by a processor, cause a first mobility management network element in a first network to:
receive first information from an access network device in the first network, wherein the first information indicates a handover of a terminal device from the first network to a second network, wherein the handover is a single radio voice call continuity (SRVCC) handover, wherein the second network is a second-generation (2G) network or a third-generation (3G) network, wherein the first mobility management network element is an access and mobility management function (AMF) network element, and wherein the first network is a fifth-generation (5G) network;

skip, based on the first information, an operation of sending a session management context request to a session management network element in the first network, wherein the first information comprises at least one of a first identifier of a voice handover from the first network to the second network or a target identifier of the second network; and send, based on the first information, second information to a second mobility management network element in a third network, wherein the second information instructs the second mobility management network element to send a handover request to a mobile switching network element in the second network, wherein the handover request is a packet-switched to circuit-switched request message, wherein the handover request requests handing over a voice service of the terminal device to the second network, wherein the second mobility management network element is a mobility management entity (MME) network element, wherein the third network is an Evolved Packet System (EPS) network, and wherein the mobile switching network element is a mobile switching center (MSC) network element.

16. The computer program product of claim 15, wherein the computer-executable instructions, when executed by the processor, further cause the first mobility management network element to send third information about the terminal device to the second mobility management network element, and wherein the third information comprises subscription information for handing over the voice service to the second network.

17. A network handover method of a voice service of a terminal device, wherein the network handover method comprises:

receiving, by a first mobility management network element in a first network, first information from an access network device in the first network, wherein the first mobility management network element is an access and mobility management function (AMF) network element, wherein the first network is fifth-generation (5G) network, wherein the first information indicates a handover of the terminal device from the first network to a second network, wherein the handover is a single radio voice call continuity (SRVCC) handover, and wherein the second network is a second-generation (2G) network or a third-generation (3G) network;

skipping, by the first mobility management network element based on the first information, an operation of sending a session management context request to a session management network element in the first network, wherein the first information comprises at least one of a first identifier of a voice handover from the first network to the second network or a target identifier of the second network;

sending, by the first mobility management network element based on the first information, second information to a second mobility management network element in a third network, wherein the second information instructs the second mobility management network element to send a handover request to a mobile switching network element in the second network, wherein the handover request is a packet-switched to circuit-switched request message, wherein the handover request requests handing over the voice service to the second network, wherein the second mobility management network element is a mobility management entity (MME) network element, wherein the third network is an Evolved Packet System (EPS) network, and wherein the mobile switching network element is a mobile switching center (MSC) network element;

determining, by the first mobility management network element, that the handover of the terminal device from the first network to the second network is completed;

sending, by the first mobility management network element, a session deletion request to the session management network element in the first network; and deleting, by the session management network element, stored session management context information of the terminal device in the first network.

18. The network handover method of claim 17, further comprising sending, by the access network device to the first mobility management network element, the first information.

19. A system comprising:

a session management network element in a first network, wherein the first network is a fifth-generation (5G) network; and a first mobility management network element in the first network, wherein the first mobility management network element is an access and mobility management function (AMF) network element and configured to:

receive first information from an access network device in the first network, wherein the first information indicates a handover of a terminal device from the first network to a second network, wherein the handover is a single radio voice call continuity (SRVCC) handover, and wherein the second network is a second-generation (2G) network or a third-generation (3G) network;

skip, based on the first information, a session management context operation with the session management network element in the first network, wherein the first information comprises at least one of a first identifier of a voice handover from the first network to the second network or a target identifier of the second network; and send, based on the first information, second information to a second mobility management network element in a third network, wherein the second information instructs the second mobility management network element to send a handover request to a mobile switching network element in the second network, wherein the handover request is a packet-switched to circuit-switched request message, wherein the handover request requests handing over a voice service of the terminal device to the second network, wherein the second mobility management network element is a mobility management entity (MME) network element, wherein the third network is an Evolved Packet System (EPS) network, and wherein the mobile switching network element is a mobile switching center (MSC) network element.

20. The system of claim 2, wherein the first mobility management network element is further configured to further skip the session management context operation by not sending a session management context request to the session management network element.

21. The system of claim 19, wherein the first mobility management network element is further configured to send third information about the terminal device to the second mobility management network element, and wherein the third information comprises subscription information for handing over the voice service to the second network.

22. The system of claim 19, further comprising the access network device, wherein the access network device is configured to send the first information to the first mobility management network element.

\* \* \* \* \*

UNITED STATES PATENT AND TRADEMARK OFFICE
CERTIFICATE OF CORRECTION

| | |
|---|---|
| PATENT NO. | : 11,700,566 B2 |
| APPLICATION NO. | : 17/067366 |
| DATED | : July 11, 2023 |
| INVENTOR(S) | : Weiwei Chong and Xiaobo Wu |

It is certified that error appears in the above-identified patent and that said Letters Patent is hereby corrected as shown below:

In the Claims

Claim 20, Column 68, Line 65: "claim 2" should read "claim 19"

Signed and Sealed this
Fifth Day of September, 2023

Katherine Kelly Vidal
*Director of the United States Patent and Trademark Office*